US011475004B2

(12) United States Patent
Goergens et al.

(10) Patent No.: US 11,475,004 B2
(45) Date of Patent: Oct. 18, 2022

(54) OPTIMIZING DATABASE QUERIES

(71) Applicant: SAP SE, Walldorf (DE)

(72) Inventors: Maik Goergens, Nussloch (DE); Jonathan Dees, Heidelberg (DE)

(73) Assignee: SAP SE, Walldorf (DE)

( * ) Notice: Subject to any disclaimer, the term of this patent is extended or adjusted under 35 U.S.C. 154(b) by 321 days.

(21) Appl. No.: 15/702,004

(22) Filed: Sep. 12, 2017

(65) Prior Publication Data

US 2019/0079974 A1    Mar. 14, 2019

(51) Int. Cl.
  *G06F 16/2453*    (2019.01)
  *G06F 16/2452*    (2019.01)
(52) U.S. Cl.
  CPC .. *G06F 16/24542* (2019.01); *G06F 16/24524* (2019.01)
(58) Field of Classification Search
  None
  See application file for complete search history.

(56) References Cited

U.S. PATENT DOCUMENTS

| | | | | |
|---|---|---|---|---|
| 7,424,477 | B1* | 9/2008 | Martin | G06F 9/524 |
| 10,459,822 | B1* | 10/2019 | Gondi | G06F 11/3604 |
| 2005/0027701 | A1* | 2/2005 | Zane | G06F 8/30 |
| 2008/0065674 | A1* | 3/2008 | Liu | G06F 16/24537 |
| 2008/0270368 | A1* | 10/2008 | Cotner | G06F 16/24542 |
| 2011/0055197 | A1* | 3/2011 | Chavan | G06F 16/2454 707/713 |
| 2014/0379690 | A1* | 12/2014 | Ahmed | G06F 16/24535 707/713 |
| 2017/0031901 | A1* | 2/2017 | Song | G06F 17/2705 |

OTHER PUBLICATIONS

Ravichandhran Madhavan; Null dereference verification via over-approximated weakest pre-conditions analysis; ACM SIGPLAN Notices; vol. 46; Issue 10; Oct. 2011; pp. 1033-1052 (Year: 2011).*

* cited by examiner

*Primary Examiner* — Mariela Reyes
*Assistant Examiner* — Jermaine A Mincey
(74) *Attorney, Agent, or Firm* — Schwegman Lundberg & Woessner, P.A.

(57) ABSTRACT

Various examples are directed to systems and methods optimizing database queries. A database management system may receive a first query comprising a plurality of query expressions. The database management system may determine that a first expression of the first query is nullable and that the first expression is null preserving. The database management system may generate optimized query code for the first query. The optimized query code may comprise a first code segment and a conditional jump instruction. The first code segment that, when executed by a processor, may cause the processor to perform operations comprising determining a value of the first expression. The conditional jump instruction may, when executed by the processor, cause the processor to perform operations comprising: skipping execution of at least a portion of the first code segment and returning null for the first expression.

20 Claims, 11 Drawing Sheets

OPTIMIZING DATABASE QUERIES

TECHNICAL FIELD

This document generally relates to methods and systems for use with computer devices, including networked computing devices. More particularly, this document relates to systems and methods for efficiently executing database queries.

BACKGROUND

Processing many database queries includes executing queries that include repeated performance of complex calculations. For example, many database queries include populating a database row or column in a database table and/or a temporary table or table fragment, such as a view. The calculation described by the query may be performed multiple times, once for each record in the result. Common interpreted syntaxes for database queries, such as Structured Query Language (SQL), are configured to state the calculations involved in a database query accurately and generally.

BRIEF DESCRIPTION OF DRAWINGS

The present disclosure is illustrated by way of example, and not limitation, in the following figures.

DETAILED DESCRIPTION

Figure 1:
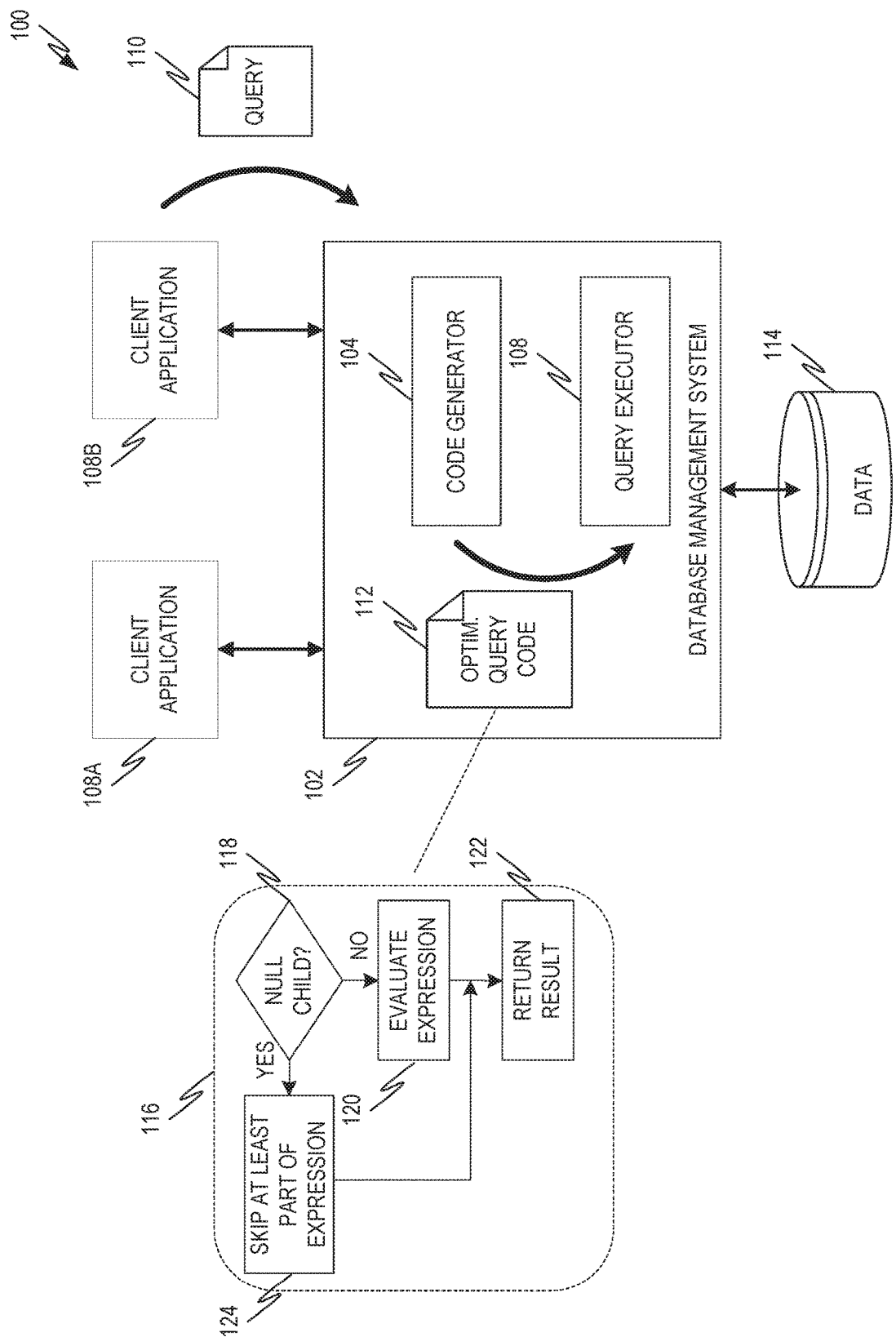
FIG. 1 is a diagram showing one example of an environment for optimizing database queries.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter.

It will be evident, however, to those skilled in the art, that embodiments of the inventive subject matter may be practiced without these specific details. In general, well-known instruction instances, protocols, structures, and techniques have not been shown in detail.

Various examples described herein are directed to determining optimized executions for database queries. A database query, for example, may include at least one expression and, in some examples, a set of nested expressions. An expression may be or include values, variables, and/or operators. A value may be numerical data and/or other data. A variable may be a name for a construct that can have an associated value. For example, a variable may refer to a construct in the memory of a database management system, a record at a database table, a row or column of a database table, etc. An operator may describe a mathematical, logical, or other calculation to be executed on one or more arguments, which may be variables and/or values.

A set of nested expressions includes a parent expression that takes a result of at least one child expression as an argument. In some sets of nested expressions, an expression may be both a parent and a child. For example, an expression may be a child relative to one expression and also have one or more child expressions of its own. An expression that does not have any parent expressions may be called a root expression. Also, some examples herein refer to sub-child expressions. A sub-child expression may be any expression that is a descendent of a child expression.

Many query syntaxes, such as SQL, call for systematically calculating query expressions. For example, to evaluate a considered expression, a SQL interpreter may evaluate all child and sub-child expressions of the considered expression. Evaluating expressions in this way, however, may be inefficient for some cases where a child or sub-child expression returns null. In some database query syntaxes, such as SQL, null indicates no value. For example, if the value of a variable is null, it indicates that there is no value for that variable. Consider an example variable for storing a date. The example variable may have a value indicating a date (e.g., within a certain range), or may hold a null value, indicating no date (e.g., if no date has been set).

In some cases, a considered expression may return null if even one of its child or sub-child expressions returns null. For those cases, evaluating additional child or sub-child expressions after one has returned null may not be necessary. Accordingly, a database management system may prepare and/or execute optimized database queries at least in part by identifying all or part of the evaluation of the considered expression that may be skipped during execution if a child or sub-child expression returns null. This may include preparing and/or executing database queries in a manner that determines that the considered expression returns null before all of its child and/or sub-child expressions are evaluated. Child or sub-child expressions that are not yet evaluated when the database management system determines that the considered expression returns null may be skipped. Also, in some examples, parent expressions of a child or sub-child that return null may be skipped. In this way, a database management system may avoid unnecessary processing that is not relevant to the result of the parent expression.

Preparing an expression for execution in a manner that determines whether it will return null may be based at least in part on null properties of the expression. The null properties of an expression describe the way that the expression handles null values. Example null properties for an expression may include whether the expression is nullable, whether the expression preserves null, and whether the expression preserves not null. An expression that is nullable may be permitted to return null. An expression that preserves null returns null if any argument or arguments of the expression are null. For example, an expression with an addition operator preserves null because if any arguments of the additional operation are null, the sum will also be null. An example of an expression that does not preserve null is an if/then/else statement. If a value of the "then" argument is null and the value of the "else" argument is not null, the result may be null or not null, depending on the value of the conditional "if" statement. Also, in some examples, an expression may preserve not null. That is, if no arguments of the expression are null, it will return a value that is not null.

In some examples, one or more null properties of an expression are inherited from a parent or other ancestor expression. For example, the database management system may prepare a considered expression for execution, as described herein, considering null information associated with the considered expression. Null information, if present, may refer to a parent or other ancestor expression and may indicate which expressions of the query will be null if the considered expression is null. For example, null information may indicate a portion of the query that may be skipped if the considered expression is null. Also, in some examples, null properties for a considered expression may include whether one or more child expressions of the considered expression are nullable.

In some examples, the systems and methods described herein are executed at a database management system that implements code generation. For example, the database management system may receive queries expressed in SQL or another interpreted syntax. A code generator at the database management system receives the query, expressed in SQL or another interpreted syntax and generates optimized query code for executing the query. Generated code may be in the C programming language or another suitable language. The database management system may execute the code to implement the query. The code may be flexible, permitting some instructions for evaluating child and/or sub-child expressions to be skipped if a parent expression is already known to be null, as described herein. Various examples are directed to systems and/or methods that prepare optimized query code and/or execute optimized query code.

FIG. 1 is a diagram showing one example of an environment 100 for optimizing database queries. The environment 100 comprises a database management system 102 that manages a database 114. The database management system 100 may be or include any suitable database management system. In some examples, the database management system 100 may be or include an example of the HANA system from SAP SE of Walldorf, Germany, an example of the VORA system, also from SAP SE of Walldorf, Germany, etc.

The database management system 102 may be programmed to manage data stored at the database 114. For example, the database management system 102 may be programmed to load data to the database 114 and/or to execute one or more queries of the database 114. The database management system 102 may comprise any suitable computing device or computing devices such as, for example, one or more servers.

Database queries may be received from one or more client applications 108A, 108B. Client applications 108A, 108B may execute, for example, at any suitable computing device local to or remote from the one or more computing devices implementing the database management system 102. An example query 110 directed from the client application 108B to the database management system 102 is shown in FIG. 1. The query 110 may comprise one or more expressions (e.g., a nested set of expressions). The query 110 may be expressed in SQL or another query syntax. The query 110 may have been automatically generated by the client application 108B (or other application) or, in some examples, is generated by a human user, for example, via the client application 108B.

The database management system 102 may receive the query 110 and generate optimized query code 112 that optimizes one or more expressions of the query. Optimized query code 112 may be generated by a code generator 104. The optimized query code 112 may be executed by a query executor 108, for example, to generate a response to the query 110, which may be provided to the requesting client application 108B.

The optimized query code 112, when executed at the query executor 108, may cause the query executor 108 to evaluate at least one expression of the query 110 in a manner that skips at least a portion of the expression based on its null properties. For example, consider an expression that preserves null and has two child expressions: a first child expression that returns null and a second child expression. The optimized query code 112 may instruct the query executor 108 to determine that the first child expression returns null and then return null for the considered expression while skipping evaluation of the second child expression.

FIG. 1 also shows a flowchart illustrating one example of a process flow fragment 116 indicating how the optimized query code 112 may instruct the query executor 108 to evaluate an expression of the query 110 (a considered expression). The considered expression may preserve null. That is, if one of the child expressions of the considered expression returns null, then the considered expression may also return null. Although the process flow fragment 116 is described in terms of one considered expression, the optimized query code 112 may instruct the query executor 108 to evaluate more than one expression of the query 110 in a manner similar to that expressed by the process flow fragment 116.

At operation 118, the query executor 108 may determine whether at least one child expression of the considered expression returns null. If not, then the query executor 108 may evaluate the considered expression at operation 120, including, for example, evaluating child expressions of the considered expression. The query executor 108 may return a result of the considered query at operation 122. The result, in some examples, makes up all or part of a response to the query 110. In other examples, the result makes up all or part of an argument provided to another expression.

Figure 2:
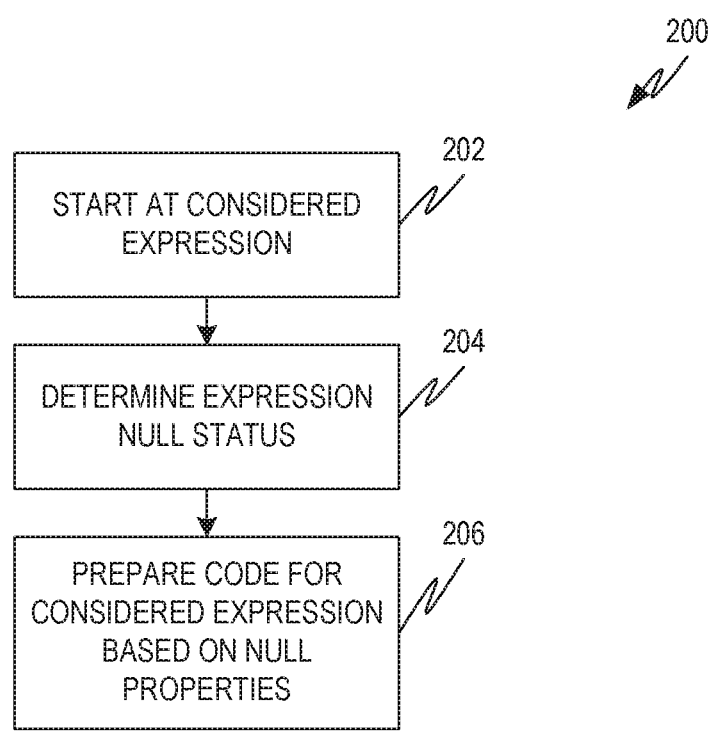
FIG. 2 is a flowchart showing one example of a process flow that may be executed by a database management system to generate optimized query code for optimizing a database query.

If one or more of the child expressions considered at operation 118 does return null, then the query executor 108 may, at operation 124, skip evaluation of at least part of at least one child expression. For example, because the considered expression preserves null, it may not be necessary to evaluate any further child expressions after determining that one child expression is null. The query executor 108 may return a result of the considered expression at 122. Because at least one child expression returned null, the result of the considered expression returned at operation 122 may also be null. FIG. 2 is a flowchart showing one example of a process flow 200 that may be executed by a database management system, such as the database management system 102 of FIG. 1, to generate optimized query code for optimizing a database query. In some examples, the process flow 200 may be executed by a code generator of the database management system.

At operation 202, the code generator may begin with a considered expression and, if present, null information for the considered expression. Initially, the considered expression may be a root expression of the database query, although, as described herein, the process flow 200 may also be executed with respect to one or more child expressions in the database query. Null information may be present, for example, if a parent or other ancestor expression of the considered expression will return null if the considered expression returns null (or, in some examples, if a child or sub-child expression returns null). The null information may refer to the parent or other ancestor expression that will return null if the considered expression returns null. The code generator may utilize null information, if present, to configured the optimized query code to skip all or part of evaluating the parent or other ancestor if the considered expression returns null. For example, the reference to the parent or ancestor expression may include a jump location in the optimized query code that the query executor may jump to if the considered expression returns null.

At operation 204, the code generator may determine null properties of the considered expression. For example, the code generator may determine whether the considered expression is nullable, whether the considered expression preserves null, and/or whether the considered expression preserves not null. In some examples, the null properties of the considered expression also include an indication of whether at least one child expression is nullable.

At operation 206, the code generator may prepare code for evaluating the considered expression based on its null properties. This may include, for example, preparing code for evaluating the considered expression and preparing code for skipping all or a portion of the evaluation of the query if the considered expression is null. Preparing code for evaluating the considered expression may include preparing code for evaluating one or more child expressions of the considered expression. In some examples, this may include executing the process flow 200 recursively. For example, to evaluate a child expression of the considered expression at operation 206, the code generator may execute an additional iteration of the process flow 200 with the child expression as a new considered expression. A null information state and (optionally) null information for the new considered expression may be passed to the additional iteration of the process flow 200. Code returned by the additional iteration may be incorporated into the code for the original considered expression, for example, as described herein. Additional recursive iterations of the process flow 200 may be executed for other child expressions of the original considered expression, for sub-child expressions of the original considered expression, etc.

Figure 3:
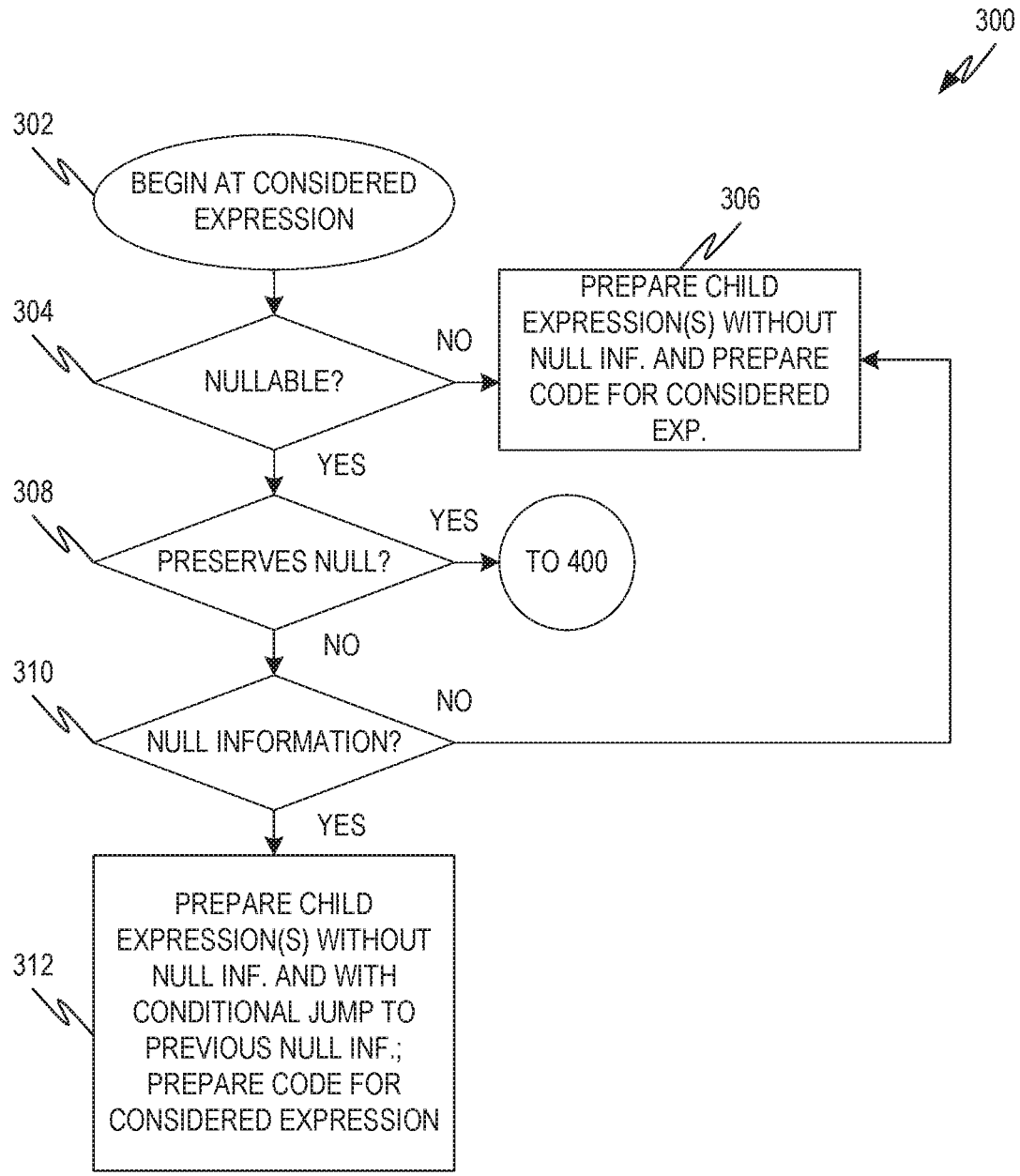
FIGS. 3 and 4 are flowcharts that describe how the code generator may prepare code for an expression based at least in part on the null properties of the expression and its null information state.
Figure 4:
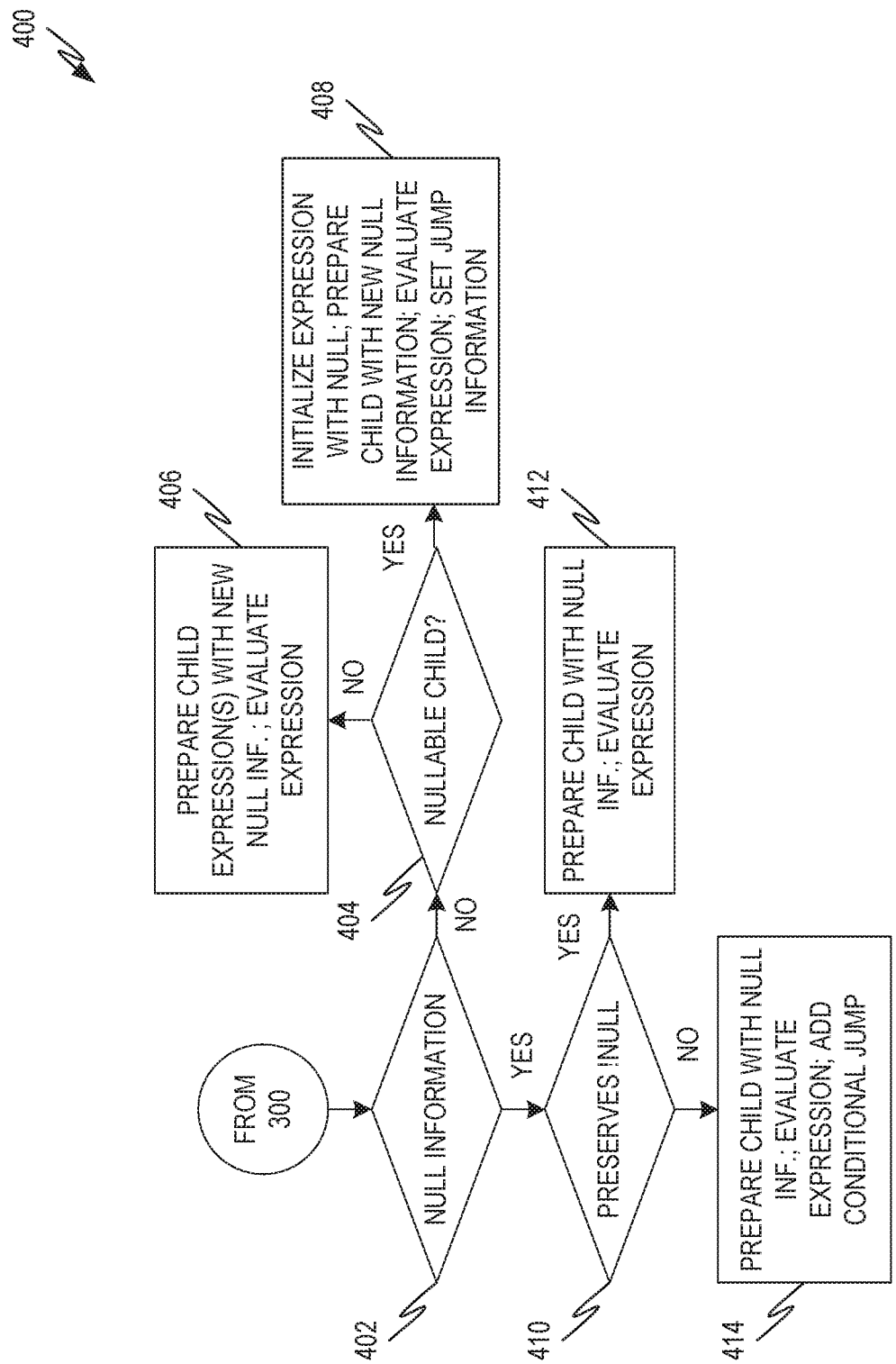

FIGS. 3 and 4 are flowcharts showing example process flows 300 and 400, respectively, that describe how the code generator may prepare code for an expression based at least in part on the null properties of the expression and its null information state. For example, FIGS. 3 and 4 show one example way that the operation 206 of the process flow 200 may be executed. Referring first to FIG. 3, at operation 302, the code generator may begin at the considered expression. At operation 304, the code generator may determine if the considered expression is nullable. If not, the code generator may, at operation 306, prepare code for the considered expression. Preparing code for the considered expression may include preparing code for child expressions of the considered expression without a null instruction and preparing code for the considered expression. Preparing code for a child expression or expressions may include, for example, executing an iteration of the process flow 200 with respect to the child expression. If the considered expression has more than one child expression, then more than one iteration of the process flow 200 may be executed. If no child expressions are present, then no child expression code may be generated. Preparing code to evaluate the considered expression may include preparing code that applies one or more operators of the considered expression to arguments, such as values, variables corresponding to results of child expressions, etc.

If the considered expression is nullable, the code generator may determine, at operation 308, whether the considered expression preserves null. If yes, the code generator may proceed to the process flow 400 of FIG. 4, as shown. If the considered expression does not preserve null, the code generator may determine, at operation 310, whether the considered expression is to be prepared considering null information. If not, the code generator may proceed to operation 306, as described above.

If the null information state for the considered operation is true at operation 310, then the considered expression may be associated with null information referencing a parent or other ancestor expression. For example, the null information may indicate a jump location in the optimized query code where the query executor should jump when the considered expression is null to skip at least a portion of the optimized query code. For example, if the considered expression is associated with null information, the code generator may prepare code for the considered expression at operation 312. This may include preparing code for child expressions (if any) without null information, preparing code to evaluate the considered expression, and preparing a conditional jump instruction. The conditional jump instruction may instruct the query executor to jump to a position associated with the parent or other ancestor expression indicated by the null information in the event that the considered expression is null. This may cause the parent or other ancestor expression to also return null.

Referring now to FIG. 4, if the considered instruction does preserve null at operation 308, then the code generator may determine, at operation 402, whether the null information state for the considered operation is true. If not, then the code generator may determine, at operation 404, whether the considered expression has any child expressions that are nullable. If not, the code generator may prepare code for the considered expression at operation 406. This may include preparing code for child expressions of the considered expression (if any) with null information referencing the considered expression and preparing code to evaluate the considered expression.

If, at operation 404, the code generator determines that the considered expression has at least one nullable child expression, it may prepare code for the considered expression at operation 408. This may include setting an initial value of the considered expression to null, preparing code for child expressions of the considered expression (if any) with null information referring to the considered expression, preparing code that evaluates the expression, and preparing code indicating a jump location to the expression indicated by the null information. For example, when the query executor executes the optimized query code, the considered expression may be set to null first. Then the query executor may execute the code for the child expressions, which may be configured to instruct the query executor to jump to the jump location if one or more of the child expressions return null. This may skip the code evaluating the considered expression, leaving the value of the considered expression null.

If, at operation 402, the code generator determines that the considered expression does include null information, it may determine, at operation 410, whether the considered expression preserves not null. If the considered expression does not preserve not null, then the code generator may prepare code for the considered expression at operation 414. This may include preparing code for child expressions (if any) of the considered application, preparing code to evaluate the considered expression, and adding a conditional jump instruction that references the parent or other ancestor expression described by the null information. The conditional jump instruction may instruct the query executor to jump to a position associated with the parent or other ancestor expression indicated by the null information in the event that the considered expression is null. This may cause the parent or other ancestor expression to also return null.

If, at operation 410, the code generator determines that the considered expression does preserve not null, it may prepare code for the considered expression at operation 412. This may include preparing code for child expressions (if any) of the considered expression with null information referencing the same expression referenced by the null information associated. with the considered expression, and preparing code to evaluate the considered expression.

TABLE 1 describes a series of cases that may be encountered by the code generator while preparing optimized query code for a considered expression at operation 206. Rows of the TABLE 1 indicate different cases and columns indicate values for null properties. For example. TABLE 1 illustrates values for example null properties including: whether the considered expression is nullable, where the considered expression preserves null, and whether a child expression of the considered expression is nullable. Values for the null properties are indicated with a "+" indicating that a null property is true, a "−" indicating that the null property is false and "−/+" indicating that the null property may be either true or false in the indicated case.

TABLE 1

| Case No. | Nullable | Preserves Null | Preserves Not Null | Null Inf.? | Child Nullable? |
| --- | --- | --- | --- | --- | --- |
| 1 | − | −/+ | −/+ | −/+ | −/+ |
| 2 | + | − | −/+ | − | −/+ |
| 3 | + | − | −/+ | + | −/+ |
| 4 | + | + | −/+ | − | + |
| 5 | + | + | −/+ | − | − |
| 6 | + | + | − | + | −/+ |
| 7 | + | + | + | + | −/+ |

In Case 1, the considered expression is not nullable, meaning that it is not permitted to return null. For example, the considered expression may be a variable indicating a row number or column number of a table at the database. For a considered expression in Case 1, the code generator may prepare code for child expressions of the considered expression (if any) with the null information state for the child expressions set to false and prepare code to evaluate the considered expression. Preparing code to evaluate a child expression may include executing the process flow 200 for the child expression. If the considered expression has multiple child expressions, then the process flow 200 may be executed multiple times (e.g., once for each expression). Preparing code to evaluate the considered expression may include preparing code that applies one or more operators of the considered expression to arguments, such as values, results of child expressions, etc.

In Case 2, the considered expression is nullable, does not preserve null, and no mill information is associated with the considered expression. The code generator may prepare code to execute a considered expression described by Case 2 in the same way that it does for considered expressions described by Case 1. For example, the code generator may prepare code for any child expressions of the considered expression with the null information state for the child expressions set to false and prepare code to evaluate the considered expression.

In Case 3, the considered expression is nullable, does not preserve null, and is associated with null information. The code generator may prepare code for child expressions (if any) without null information, prepare code to evaluate the considered expression, and prepare a conditional jump instruction. The conditional jump instruction may instruct the query executor to jump to a position associated with the parent or other ancestor expression indicated by the null information in the event that the considered expression is null. This may cause the parent or other ancestor expression to also return mill.

In Case 4, the considered expression is nullable, preserves null, is not associated with null information, and has at least one child expression that is nullable. The code generator may set an initial value of the considered expression to null, prepare code for child expressions of the considered expression (if any) with null information referring to the considered expression, prepare code that evaluates the expression, and preparing code indicating a jump location.

In Case 5, the considered expression is nullable, preserves null, is not associated with null information, and does not have any nullable child expressions. The code generator may prepare code for child expressions (if any) of the considered expression with null information referencing the considered expression and prepare code to evaluate the considered expression.

In Case 6, the considered expression is nullable, preserves null, does not preserve not null, and is associated with null information. The code generator may prepare code for child expressions (if any) of the considered application, prepare code to evaluate the considered expression, and add a conditional jump instruction that references the parent or other ancestor expression described by the null information.

In Case 7, the considered expression is nullable, preserves null, preserves not null, and is associated with null information. The code generator may prepare code for child expressions (if any) of the considered expression with null information referencing the same expression referenced by the null information associated with the considered expression, and prepare code to evaluate the considered expression.

Figure 5:
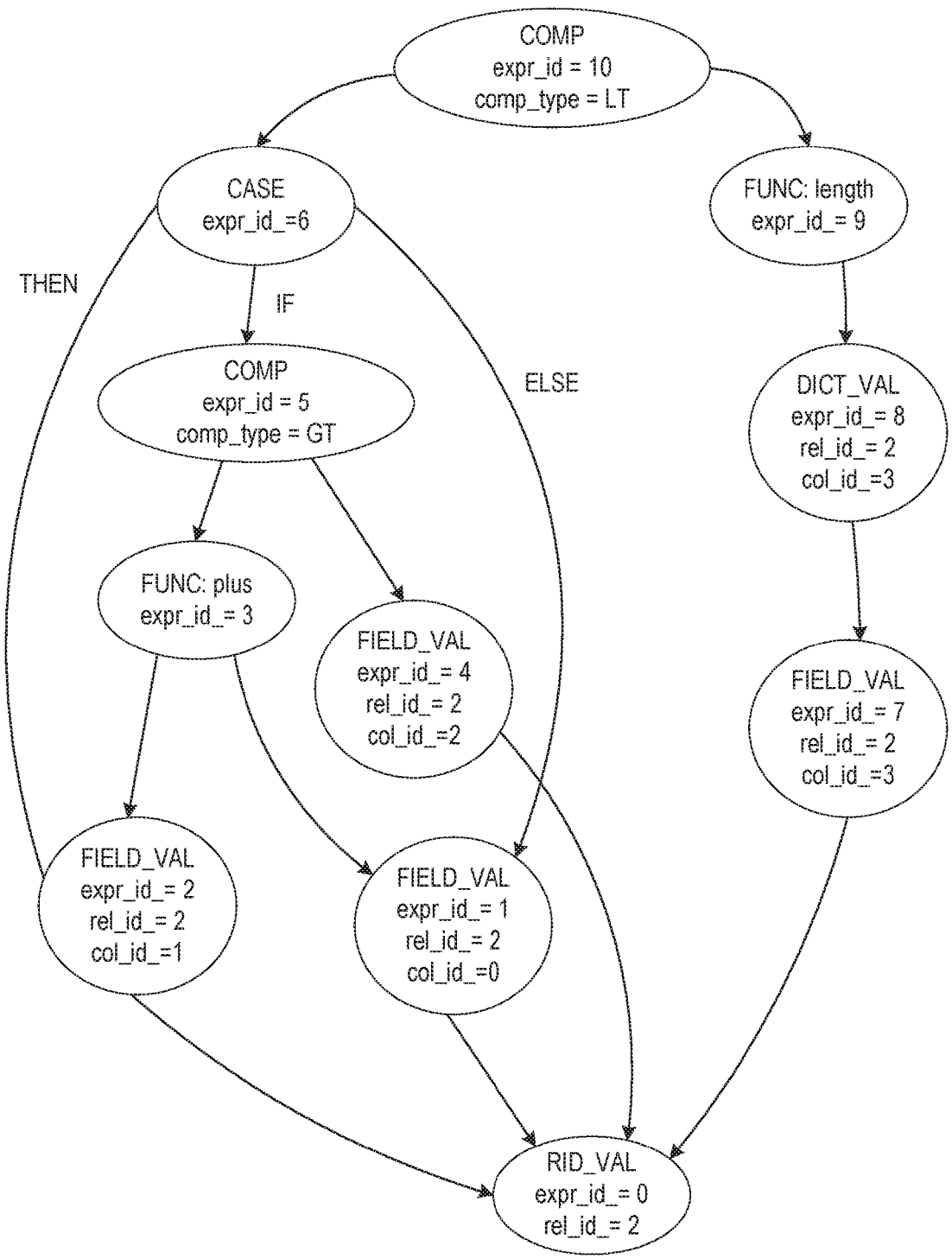
FIG. 5 is diagram showing one example of a database query plan including a set of nested expressions.

FIG. 5 is diagram showing one example of a database query plan 500 including a set of nested expressions. The database query plan 500 is shown in FIG. 5 as an expression tree where expressions are shown as nodes and parent/child relationships between expressions are indicated by arrows. For example, arrows may be directed from parent expressions to child expressions of the parent expressions. Expressions of the database query plan 500 are referred to herein by their expression identifications, indicated in FIG. 5 as "expr_id." A code generator, such as the code generator 104 of the database management system 102 of FIG. 1, may generate optimized query code for executing the query plan 500 at a query executor, such as the query executor 108. In the example described herein, the optimized query code is expressed in the C programming language, although any suitable programming language may be used.

The code generator may begin at expression 10, which may be the root expression of the database query. The code generator may execute the process flow 200 with the expression 10 as the considered expression. Because the expression 10 is a root expression, it may not have associated null information. In the example of FIG. 5, expression 10 is a "less than" comparison, indicated by its comparison type property "comp_type=LT." For example, expression 10 returns a logical one if the left hand argument (the result of expression 6) is less than the right hand argument (the result of expression 9). Otherwise, the expression 10 returns a logical zero.

A "less than" comparison expression is nullable. For example, it may return null. A "less than" comparison also preserves null. For example, if one of its arguments is null, then the "less than" function returns null. Also, expression 6 and expression 9 are both nullable, described in more detail herein. Accordingly, the code generator may prepare code for the expression 10 as described above with respect to Case 4 an/or operation 408 from above. For example, the code generator may initially set a result for expression 10 to null, prepare code for child expressions 6 and 9 with null information referring to expression 10, prepare code to evaluate expression 10, and set a jump location for expression 10. Example code for doing this is provided Code Example 1 below:

---
CODE EXAMPLE 1:
---
```
expr_10 = BOOL_NULL
/* placeholder for expr 6 with null_info = 10 */
/* placeholder for expr 9 with null_info = 10 */
expr_10 = ( expr_6 < expr_9 );
expr_known_10:;
```
---

Code Example 1 includes comment placeholders where code for evaluating expressions 6 and 9 will be positioned when it is prepared. Code for preparing expressions 6 and 9 may be determined, for example, by executing additional iterations of the process flow 200. In Code Example 1 the instruction "expr_10=BOOL_NULL," when executed by the query executor, causes the query executor to set the value of expression 10 to null. The instruction "expr_10= (expr_6<expr_9)," when executed by the query executor, causes the query executor to set the value of expression 10 to the comparison between expression 6 and expression 9 described above. The jump location, "expr_known_10" indicates a location in the code to which the query executor may jump to skip all or part of the evaluation of expression 10. For example, jumping to the location "expr_known_10" may skip all or part of the evaluation of expression 6 and/or all or part of the evaluation of expression 9. Jumping to the location "expr_known_10" may also cause the query executor to skip the instruction indicated above that changes the value of expression 10 from null. This may cause expression 10 to return null.

The code generator may prepare code for evaluating expression 6. This may include executing a recursive iteration of the process flow 200 with respect to expression 6. Expression 6, in the example of FIG. 5, is an if/then/else statement. For example, if expression 5 is true, then expression 6 is equal to the value of expression 2. On the other hand, if expression 5 is false, then expression 6 is equal to expression 1. Accordingly, expression 6 is nullable, but does not preserve null. Also, per the example above, expression 6 is to be prepared with null information referring to expression 10. For example, the null information may include a reference to the jump location associated with expression 10, e.g., "expr_known_10."

Based on these null properties, the code generator may prepare code for expression 6 based on Case 3 and/or operation 312 from above. Accordingly, the code generator may prepare code for the child expressions of expression 6 without null information, may prepare code that evaluates expression 6, and may add an instruction that, if expression 6 returns null, conditionally jumps to the jump location indicated by expression 6's null information (e.g., the jump location associated with expression 10, e.g., "expr_known_10"). Code Example 2 below shows a modification to Code Example 1 where the placeholder comment for expression 6 is replaced by code and/or place holder comments for the operations described above:

---
CODE EXAMPLE 2:
---
```
expr_10 = BOOL_NULL
/* placeholder for expr 5 w/o null_info */
/* placeholder for expr 2 w/o null_info */
/* placeholder for expr 1 w/o null_info */
if( expr_5 ) { expr_6 = expr_2; } else { expr_6 =
   expr_1; }
if( expr_6 == INT_NULL ) { goto expr_known_10; }
/* placeholder for expr 9 with null_info = 10 */
expr_10 = ( expr_6 < expr_9 );
expr_known_10:;
```
---

In Code Example 2, new coded added relative to Code Example 1 is bolded. Note that expressions 5, 2, and 1 are child expressions of expression 6 and, hence, are to be prepared with no null information. The instruction, "if (expr_5) {expr_6=expr_2;} else {expr_6=expr_1;}," when executed by a query executor, may cause the query executor to evaluate expression 6. Also, the instruction "if (expr_6==INT_NULL) {goto expr_known_10;}" is an example instruction for conditionally jumping to the jump location if expression 6 returns null.

The code generator may also prepare code for expression 9. Expression 9 returns the length of expression 8. Expression 9 is nullable. It preserves null, preserves not null and, as described above, it is associated with null information that refers to expression 10 (e.g., the jump location for expression 10 described above). Based on these null properties, the code generator may prepare code for expression 9 according to Case 7 and/or operation 416 from above. Accordingly, the code generator may prepare code for the child expressions of expression 9 with null information that is equivalent to the null information of expression 9 (in this example, null information that refers to expression 10). The code generator may also prepare code that evaluates expression 9. Code Example 3 below shows a modification to Code Example 2 where the placeholder comment for expression 9 is replaced by code and/or place holder comments for the operations described above:

---
CODE EXAMPLE 3:
---
```
expr_10 = BOOL_NULL
/* placeholder for expr 5 w/o null_info */
/* placeholder for expr 2 w/o null_info */
```

CODE EXAMPLE 3:

```
/* placeholder for expr 1 w/o null_info */
if( expr_5 ) { expr_6 = expr_2; } else { expr_6 =
    expr_1; }
if( expr_6 == INT_NULL ) { goto expr_known_l0; }
/*placeholder for expr 8 with null_info=10 */
expr_9 = length( expr_8 );
expr_10 = ( expr_6 < expr_9 );
expr_known_10:;
```

In Code Example 3, new coded added relative to Code Example 2 is bolded. Note that expression 8 is the child expression of expression 9 and, therefore, is to be prepared with null information referring to expression 10, as described above. The instruction "expr_9=length(expr_8);" when executed by the a query executor, may cause the query executor to evaluate expression 9.

The code generator may also prepare code for expressions 5, 2, 1, and 8. Expression 5 is a comparison of type greater than (indicated by comp_type=GT). For example, if expression 3 is greater than expression 4, then expression 5 returns a logical one. Otherwise, expression 5 returns a logical zero. Accordingly, expression 5 is nullable. It preserves null. Also, expression 5 has nullable child expressions. (E.g., both the field value of expression 4 and the plus or addition function of expression 3 are nullable). Also, recall that the code generator is to prepare code for expression 5 without null information.

Based on these null properties, the code generator may prepare code for expression 5 based on Case 4 and/or operation 408 from above. Accordingly, the code generator may initially set a result for expression 5 to null, prepare code for its child expressions 3 and 4 with null information referring to expression 5, prepare code to evaluate expression 5, and set a jump location for expression 5. Code Example 4 below shows a modification to Code Example 3 where the placeholder comment for expression 5 is replaced by code and/or place holder comments for the operation described above. New code relative to Code Example 3 is bolded:

CODE EXAMPLE 4:

```
expr_10 = BOOL_NULL
expr_5 = BOOL_NULL;
/*placeholder for expr 3 with null_info = 5 */
/*placeholder for expr 4 with null_info = 5 */
expr_5 = ( expr_3 > expr_4 );
expr_known_5:;
/* placeholder for expr 2 w/o null_info */
/* placeholder for expr 1 w/o null_info */
if ( expr_5 ) { expr_6 = expr_2; } else { expr_6 =
    expr_1; }
if( expr_6 == INT_NULL ) { goto expr_known_10; }
/*placeholder for expr 8 with null_info=10 */
expr_9 = length( expr_8 );
expr_10 = ( expr_6 < expr_9 );
expr_known_10:;
```

In Code Example 4, the instruction "expr_5=BOOL_NULL;" when executed by the query executor, may cause the query executor to set the value of expression 5 to null. The instruction "expr_5=(expr_3>expr_4);" when executed by the query executor, may cause the query executor to set the value of expression 5 to the comparison between expression 3 and expression 4 described above. The jump location "expr_known_5:" indicates a location in the optimized query code to which the query executor may jump to skip all or part of the evaluation of expression 5. For example, lumping to the location "expr_known_5:" may skip all or part of the evaluation of expression 3 and/or all or part of the evaluation of expression 4. Jumping to the location "expr_known_5:" may also cause the query executor to skip the instruction indicated above that changes the value of expression 5 from null. This may cause expression 5 to return null.

Expression 2 is a field value from a table at the database managed by the database management system. Expression 2 is described by a relational identifier identifying the table where it is located, "rel_id=2" and a column identifier indicating the table column where it is located, "col_id=1." The row where the field value is located is determined by expression 2's child expression, expression 0, which may be a counting variable that is incremented over a range indicated by the query to cycle through different rows of the indicated table. Accordingly, expression 2 is nullable and it preserves null. Its child expression 0 is not nullable. Also, as described above, expression 2 is to be prepared without null information.

Based on these null properties, the code generator may prepare code for expression 2 based on Case 5 and/or operation 406 described above. Accordingly, the code generator may prepare code for the child expression of expression 2 (e.g., expression 0) with null information referring to expression 2 and prepare code for evaluating expression 2. Code Example 5 below shows a modification to Code Example 4 where the placeholder comment for expression 2 is replaced by code and/or placeholder comments for the operations described above. Changes relative to Code Example 4 are bolded:

CODE EXAMPLE 5:

```
expr_10 = BOOL_NULL
expr_5 = BOOL_NULL;
/*placeholder for expr 3 with null_info = 5 */
/*placeholder for expr 4 with null_info = 5 */
expr_5 = ( expr_3 = expr_4 );
expr_known_5:;
/*placeholder for expr 0 with null_info = 2 */
expr_2 = field_2_1[ expr_0 ];
/* placeholder for expr 1 w/o null_info */
if( expr_5 ) { expr_6 = expr_2; } else { expr_6 =
    expr_1; }
if( expr_6 == INT_NULL ) { goto expr_known_10; }
/*placeholder for expr 8 with null_info=10 */
expr_9 = length( expr_8 );
expr_10 = ( expr_6 < expr_9 );
expr_known_10:;
```

In Code Example 5, the instruction, "expr_2=field_2_1[expr_0];" when executed by the query executor, may cause the query executor to set the value of expression 2 to the value at the field indicated by expression 2 and its child expression, expression 0.

Expression 1 is also a field value from the table indicated by expression 2, described by a relational identifier, "rel_id=2." The field value of expression 1 may be at a different column of the table, indicated by "col_id=0." Like expression 2, the row where the field value of expression 1 is located is also determined by its child expression 0. Accordingly, expression 1 is nullable, preserves null, has no nullable child expressions, and is to be prepared without null information. The code generator, then, may prepare code for expression 1 that is similar to that of expression 2 described above. This is shown by Code Example 6, where changes relative to Code Example 5 are bolded:

CODE EXAMPLE 6:

```
expr_10 = BOOL_NULL
expr_5 = BOOL_NULL;
/*placeholder for expr 3 with null_info = 5 */
/*placeholder for expr 4 with null_info = 5 */
expr_5 = ( expr_3 > expr_4 );
expr_known_5:;
/*placeholder for expr 0 with null_info = 2 */
expr_2 = field_2_1[ expr_0 ];
/*placeholder for expr 0 with null_info = 1 */
expr_1 = field_2_0[ expr_0 ];
if( expr_5 ) { expr_6 = expr_2; } else { expr_6 = expr_1; }
if( expr_6 == INT_NULLL ) { goto expr_known_10; }
/*placeholder for expr 8 with null_info=10 */
expr_9 = length( expr_8 );
expr_10 = ( expr_6 < expr_9 );
expr_known_10:;
```

Expression 8 is a dictionary value from a dictionary location indicated by a table ("rel_id=2"), a column at the table ("col_id=3"), and a field value (expression 7). Expression 8 is nullable, preserves null, preserves not null, and, as indicated, is to be prepared with null information referring to expression 10. Based on these null properties, the code generator may prepare code for expression 8 based on Case 7 and/or operation 416 described above. Accordingly, the code generator may prepare code for any child expressions with null information referring to expression 10 and prepare code for evaluating expression 8. This is indicated by Code Example 7, where changes relative to Code Example 6 are bolded:

CODE EXAMPLE 7:

```
expr_10 = BOOL_NULL
expr_5 = BOOL_NULL;
/*placeholder for expr 3 with null_info = 5 */
/*placeholder for expr 4 with null_info = 5 */
expr_5 = ( expr_3 > expr_4 );
expr_known_5:;
/*placeholder for expr 0 with null_info = 2 */
expr_2 = field_2_1[ expr_0 ];
/*placeholder for expr 0 with null_info = 1 */
expr_1 = field_2_0[ expr_0 ];
if(expr_5) {expr_6 = expr_2;} else {expr_6 = expr_1; }
if( expr_6 == INT_NULL ) { goto expr_known_10; }
/*placeholder for expr 7 with null_info = 10 */
expr_8 = dict_2_3[ expr_7 ];
expr_9 = length( expr_8 );
expr_10 = ( expr_6 < expr_9 );
expr_known_10:;
```

To complete the optimized query code, the code generator may generate code for evaluating expressions 3, 4, 0, and 7, for example, by executing iterations of the process flow 200 for those expressions. Expression 3 is a sum of expression 2 and expression 1. Expression 3 is nullable, preserves null, preserves not null, and, as indicated, is to be prepared with null information referencing expression 5. Based on these null properties, the code generator may prepare code for expression 3 based on Case 7 and/or operation 416 from above. Accordingly, the code generator may prepare code for the child expressions of expression 3 with null information referring to expression 5 and prepare code for evaluating expression 3. Code Example 8 below shows modifications to Code Example 7 where the placeholder comment for expression 3 is replaced by code and/or placeholder comments for the operations described above. Changes relative to Code Example 7 are bolded:

CODE EXAMPLE 8:

```
expr_10 = BOOL_NULL
expr_5 = BOOL_NULL;
/*placeholder for expr 2 with null_info = 5 */
/*placeholder for expr 1 with null_info = 5 */
expr_3 = expr_2 + expr_1;
/*placeholder for expr 4 with null_info = 5 */
expr_5 = ( expr_3 > expr_4 );
expr_known_5:;
/*placeholder for expr 0 with null_info = 2 */
expr_2 = field_2_1[ expr_0 ];
/*placeholder for expr 0 with null_info = 1 */
expr_1 = field_2_0[ expr_0 ];
if(expr_5) {expr_6 = expr_2;} else {expr_6 = expr_1; }
if( expr_6 == INT_NULL ) { goto expr_known_10; }
/*placeholder for expr 7 with null_info = 10 */
expr_8 = dict_2_3[ expr_7 ];
expr_9 = length( expr_8 );
expr_10 = ( expr_6 < expr_9 );
expr_known_10:;
```

Expressions 4 is a field value from the table indicated by "rel_id=2," the column indicated by "col_id=2," and the row id returned by child expression 0. Accordingly, expression 4 is nullable, preserves null, does not preserve not null, and, as indicated, is to be prepared with null information referring to expression 5. Based on these null properties, the code generator may prepare code for expression 4 based on Case 6 and/or operation 414 from above. For example, the code generator may prepare code for the child expression of expression 4 with null information referring to expression 5, may prepare code for evaluating expression 4, and may add a conditional jump to expression 5 that is taken if expression 4 is null. Code Example 9 below shows a modification to Code Example, 8 where the placeholder comment for expression 4 is replaced by code and/or placeholder comments for the operations described above. Changes relative to Code Example 8 are bolded:

CODE EXAMPLE 9:

```
expr_10 = BOOL_NULL
expr_5 = BOOL_NULL;
/*placeholder for expr 2 with null_info = 5 */
/*placeholder for expr 1 with null_info = 5 */
expr_3 = expr_2 + expr_1;
/*placeholder for expr 0 with null_info = 5 */
expr_4 = field_2_2[ expr_0 ];
if( expr_4 == INT_NULL ) { goto expr_known_5; }
expr_5 = ( expr_3 > expr_4 );
expr_known_5:;
/*placeholder for expr 0 with null_info = 2 */
expr_2 = field_2_1[ expr_0 ];
/*placeholder for expr 0 with null_info = 1 */
expr_1 = field_2_0[ expr_0 ];
if(expr_5) {expr_6 = expr_2} else {expr_6 = expr_1; }
if( expr_6 == INT_NULL ) { goto expr_known_10; }
/*placeholder for expr 7 with null_info = 10 */
expr_8 = dict_2_3[ expr_7 ];
expr_9 = length( expr_8 );
expr_10 = ( expr_6 < expr_9 );
expr_known_10:;
```

Expression 7 is a field value from the table indicated by "rel_id=2," at a column indicated by "col_id=3," and a row indicated by expression 0. Accordingly, expression 7 is nullable, preserves null, does not preserve not null and, as indicated above, is to be prepared with null information referring to expression 10. Based on these null properties, the code generator may prepare code for expression 7 based on Case 6 and/or operation 414 from above. Accordingly, the code generator may prepare code for the child expression of expression 7 with null information referring to expression 10, may prepare code for evaluating expression 7, and may add a conditional jump to expression 10 that is taken if expression 7 is null. Code Example 10 below shows a modification to Code Example 9, where the placeholder comment for expression 7 is replaced by code and/or placeholder comments for the operations described above. Changes relative to Code Example 9 are bolded:

CODE EXAMPLE 10:

```
expr_10 = BOOL_NULL
expr_5 = BOOL_NULL;
/*placeholder for expr 2 with null_info = 5 */
/*placeholder for expr 1 with null_info = 5 */
expr_3 = expr_2 + expr_1;
/*placeholder for expr 0 with null_info = 5 */
expr_4 = field_2_2[ expr_0 ];
if( expr_4 == INT_NULL ) { goto expr_known_5; }
expr_5 = ( expr_3 > expr_4 );
expr_known_5:;
/*placeholder for expr 0 with null_info = 2 */
expr_2 = field_2_1[ expr_0 ];
/*placeholder for expr 0 with null_info = 1 */
expr_1 = field_2_0[ expr_0 ];
if(expr_5) {expr_6 = expr_2;} else {expr_6 = expr_1; }
if( expr_6 == INT_NULL ) { goto expr_known_10; }
/*placeholder for expr 0 with null_info = 10 */
expr_7 = field_2_3[ expr_0 ];
if( expr_7 == VID_NULL ) { goto expr_known_10; }
expr_8 = dict_2_3[ expr_7 ];
expr_9 = length( expr_8 );
expr_10 = ( expr_6 < expr_9 );
expr_known_10:;
```

The code generator may also prepare code for expressions 2 and 1 with null information referring to expression 5. Expressions 2 and 1 are both nullable, both preserve null, neither preserve not null, and both, as indicated above, are to be prepared with null information referring to expression 5. Accordingly, the code generator may evaluate expressions 2 and 1 according to Case 6 and/or operation 414 from above. Code Example 11 below shows a modification to Code Example 10, where the placeholder comment for expressions 2 and 1 are replaced by code and/or placeholder comments for the operations described above. Changes relative to Code Example 10 are bolded:

CODE EXAMPLE 11:

```
expr_10 = BOOL_NULL
expr_5 = BOOL_NULL;
/*placeholder for expr 0 with null_info = 5 */
expr_2 = field_2_1[ expr_0 ];
if( expr_2 == INT_NULL ) { goto expr_known_5; }
/*placeholder for expr 0 with null_info = 5 */
expr_1 = field_2_0[ expr_0 ];
if( expr_1 == INT_NULL ) { goto expr_known_5; }
expr_3 = expr_2 + expr_1;
/*placeholder for expr 0 with null_info = 5 */
expr_4 = field_2_2[ expr_0 ];
if( expr_4 == INT_NULL ) { goto expr_known_5; }
expr_5 = ( expr_3 > expr_4 );
expr_known_5:;
/*placeholder for expr 0 with null_info = 2 */
expr_2 = field_2_1[ expr_0 ];
/*placeholder for expr 0 with null_info = 1 */
expr_1 = field_2_0[ expr_0 ];
```

CODE EXAMPLE 11:

```
if(expr_5) {expr_6 = expr_2;} else {expr_6 = expr_1; }
if( expr_6 == INT_NULL ) { qoto expr_known_10; }
/*placeholder for expr 0 with null_info = 10 */
expr_7 = field_2_3[ expr_0 ];
if( expr_7 == VID_NULL ) { goto expr_known_10; }
expr_8 = dict_2_3[ expr_7 ];
expr_9 = length( expr_8 );
expr_10 = ( expr_6 < expr_9 );
expr_known_10:;
```

This leaves placeholders for expression 0, evaluated with null information referring to expression 5, with null information referring to expression 2, with null information referring to expression 1, and with null information referring to expression 10. Expression 0, as described herein, is a counting variable. Accordingly, the code generator may prepare code for expression 0 according to Case 1 and/or operation 306 above, regardless of the associated null information. In some examples, the code generator may prepare child expressions of expression 0 without null information, and may prepare code to evaluate expression 0. Because expression 0, in this example, has no child expressions, this operation may be omitted. Code Example 12 shows example optimized query code for the query plan 500. Changes relative to Code Example 11 are bolded:

CODE EXAMPLE 11:

```
expr_10 = BOOL_NULL
expr_5 = BOOL_NULL;
expr_0 = rid_2;
expr_2 = field_2_1[ expr_0 ];
if( expr_2 == INT_NULL ) { goto expr_known_5; }
expr_0 = rid_2;
expr_1 = field_2_0[ expr_0 ];
if( expr_1 == INT_NULL ) { goto expr_known_5; }
expr_3 = expr_2 + expr_1;
expr_0 = rid_2;
expr_4 = field_2_2[ expr_0 ];
if( expr_4 == INT_NULL ) { goto expr_known_5; }
expr_5 = ( expr_3 > expr_4 );
expr_known_5:;
expr_0 = rid_2;
expr_2 = field_2_1[ expr_0 ];
expr_0 = rid_2;
expr_1 = field_2_0[ expr_0 ];
if(expr_5) {expr_6 = expr_2;} else {expr_6 = expr_1; }
if( expr_6 == INT_NULL ) { goto expr_known_10; }
expr_0 = rid_2;
expr_7 = field_2_3[ expr_0 ];
if( expr_7 == VID_NULL ) { qoto expr_known_10; }
expr_8 = dict_2_3[ expr_7 ];
expr_9 = length( expr_8 );
expr_10 = ( expr_6 < expr_9 );
expr_known_10:;
```

Figure 6:
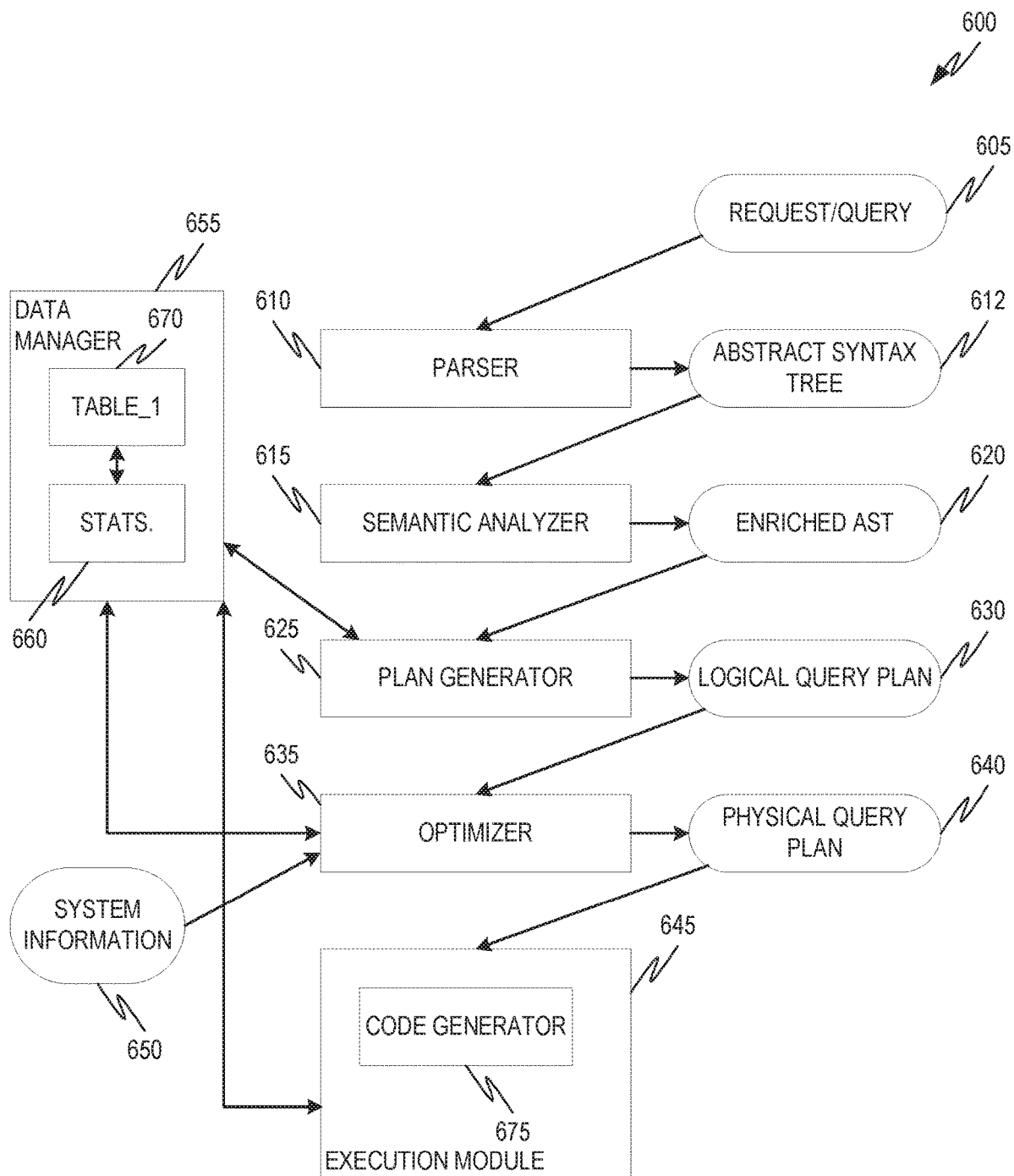
FIG. 6 is a flow diagram showing one example of a process flow for evaluation of a request to be executed in an in-memory database system.

FIG. 6 is a flow diagram showing one example of a process flow 600 for evaluation of a request 605 to be executed in an in-memory database system. For example, the request 605 may be processed as described herein in view of the null properties of various expressions making up the request 605. The request 605 may be a query associated with a data set in the in-memory database system. The request 605 may include expressions, as described herein, defining generation of results based on the associated data sets, for example stored in a database table. The request 605 may be associated with a table_1 670 of the in-memory database. The request 605 may include an SQL query for data in table_1 670, which query may include predicates and expressions defining rules for generating result data through querying the table_1 670. The request 605 is received as statements by the parser 610. The request 605 is read and analyzed by the parser 610 to generate an abstract syntax tree (AST) 612, for example, similar to the expression tree 500 of FIG. 5. In the AST 612, statements from the request 605 are logically divided and located into a tree structure positioning operands and operators along tree branches.

The parser 610 sends the generated AST 612 to a semantic analyzer 615, which generates an enriched abstract syntax tree (AST) 620. The semantic analyzer 615 validates the received AST 612 from the parser 610 in the context of the defined table_1 670. The validation of the AST 612 includes determination of whether the defined operands and operators are logically constructed to be validly performed over the data from table_1 670. Based on the validation, the semantic analyzer 615 updated the AST to generate the enriched AST 620, which additionally includes metadata for the data in the table_1 670. For example, the enriched AST 620 may include information about the number of rows in the table_1 670, the type of data stored in a specific column from the table_1 670, etc. A plan generator 625 received the enriched AST 620 from the semantic analyzer 615 to generate a logical query plan 630 for the request 605. The plan generator 625 takes the enriched AST 620 and translates it into a logical query plan 630 defining steps based on the enriched AST 620. The logical query plan 630 may consider null properties of various expressions of the enriched AST 620, as described herein.

Based on the defined logical query plan 630, an optimizer 635 determines a physical query plan 640. In an example, the determined physical query plan 640 may be interpreted to generate a result data set. In another example, the determined physical query plan 640 may be used for code generation for execution of the request 605. The optimizer 635 is coupled to the data manager 655 to receive information about the data stored in table_1 670. The optimizer 635 receives statistics 660 for the data from table_1 670 through the data manager 655. For example, such statistics 660 include minimum and/or maximum values for data in a column, a number of rows in a table, a number of columns in a table, and other statistical indicators for the data in table_1 670. Further, the optimizer 635 receives system information 650 about the system environment, where the program instructions 605 are to be executed. In such manner, the optimizer 635 receives information about the capabilities of the engine, where the program instructions 605 are executed, and information about the data, which will be processed according to the program instructions 605. The optimizer 635 may generate a set of physical plans, based on the received system information 650 and the statistics 660. A plan from the set of physical query plans may be a code generation plan. The optimizer 635 may determine an optimal physical plan for code generation, based on the input from the data manager 655 and the system info 650. In some examples, the optimizer 635 may consider null properties of one or more expressions of the enriched AST 620, as described herein.

The physical query plan 640 for code generation may be provided from the optimizer 635 to an execution module 645, which may execute runtime generated program instructions defined by a code generator 675. The execution module 645 performs the operations defined by the request 605 and transfers data from table_1 670 from the main memory of the in-memory database system through the cache memory levels and up to processor (e.g., one or more Single Instruction Multiple Data (SIMD) registers in the processor).

The execution module 645 includes the code generator 675, which may generate executable code in compiled form for the received request 605 that utilize SIMD registers, while processing data from table_1 670. The code generator 675 may define how data from table_1 670 may be evaluated based on operations and predicates defined in the request 605. The code generator 675 utilized the physical query plan 640, provided by the optimizer 635 to generate code during runtime, which defined what kind of registers from the processor to be used during processing data as defined in the request 605. A code generation plan may be designed to optimize the allocation of data into register, and may further define to utilize SIMD registers to increase performance of the execution of the program.

When the code generator 675 is associated with utilizing SIMD registers for processing data, then the generated code may further define how to separate and divide the processed data to optimize the execution of the process. The program instructions 605 may define operations associated with a large amount of data stored in table_1 670, which may not be processed at once through the SIMD registers at the processor. Therefore, the data from table_1 670 may be processed in subsets, which subsets may be defined as sections of rows. These subsets or sections may be defined to correspond in size to the size of SIMD registers. Therefore, the size of the SIMD registers may be determined and received as part of the system information 650. In some embodiments, the optimizer 635 may determine the size. In some other embodiments, the optimizer 635 may check to determine whether a SIMD register exists and if it is available. The code generator 675 may be used to determine the size of the SEM registers and select which SIMD registers are to be used. The code generator 675 may generate code during runtime that utilizes memory of SIMD registers.

Figure 7:
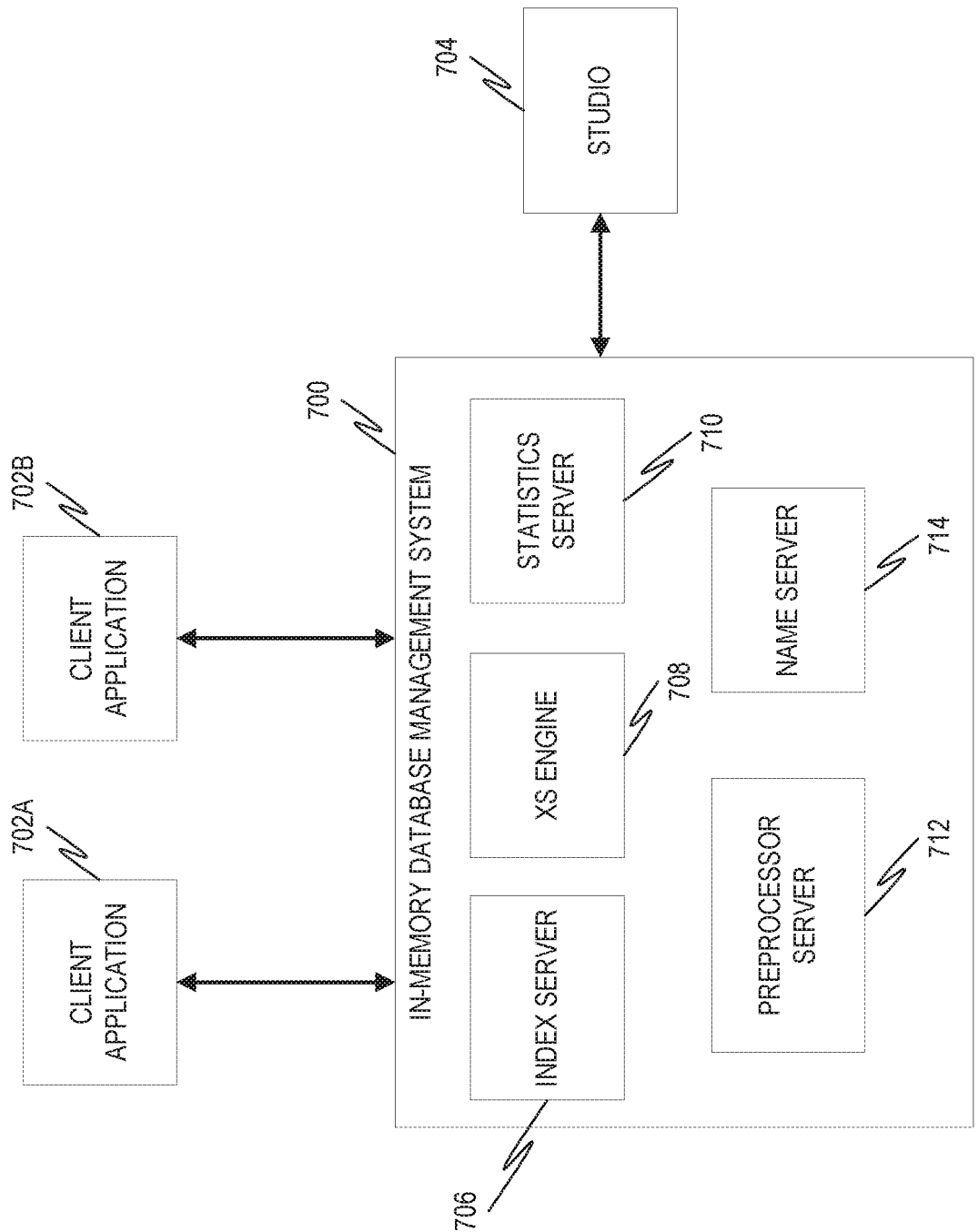
FIG. 7 is a diagram illustrating an example of an in-memory database management system that may be used to implement a web application in some examples of the network virtualization systems and methods described herein.

FIG. 7 is a diagram illustrating an example of an in-memory database management system 700 that may optimize database queries, as described here. An in-memory database stores data primarily at a main memory, such as a random access memory (RAM). This is different than databases that primarily employ a disk storage mechanism. In some examples, the database management system 700 may be or include an example of the HANA system from SAP SE of Walldorf, Germany. Although various features of web applications are described herein in the context of an in-memory database, web application security with service workers, as described herein, may be generally implemented for any type of web application.

The in-memory database management system 700 may be coupled to one or more client applications 702A, 702B. For example, client applications 702A, 702B may be examples of the web application 106 or other web applications controlled by one or more service workers as described herein. Client applications 702A, 702B may execute one or more queries utilizing data from the database including, for example, presenting a user interface (UI) to one or more users, entering data, accessing data, etc. The client applications 702A, 702B may communicate with the in-memory database management system 700 through a number of different protocols, including SQL, Multidimensional Expressions (MDX), Hypertext Transfer Protocol (HTTP), Representational State Transfer (REST), Hypertext Markup Language (HTML).

FIG. 7 also shows a studio 704 that may be used to perform modeling by accessing the in-memory database management system 700. In some examples, the studio 704 may allow complex analysis to be performed on data drawn not only from real-time event data and windows, but also from stored database information.

The in-memory database management system 700 may comprise a number of different components, including an index server 706, an XS engine 708, a statistics server 710, a preprocessor server 712, and a name server 714. These components may operate on a single computing device or may be spread among multiple computing devices (e.g., separate servers). The index server 706 contains the actual data and the engines for processing the data. It may also coordinate and uses the other servers.

The XS engine 708 allows clients to connect to the in-memory database management system 700 using web protocols, such as HTTP. Although the XS engine 708 is illustrated as a component of the in-memory database management system 700, in some examples, the XS engine 708 may be implemented as one or more Application Program interfaces (APIs) and/or services positioned between the client applications 702A, 702B and the in-memory database management system 700. For example, the XS engine 708 may be configured to process client requests received in languages other than SQL such as, for example, MINX, HTTP, REST, HTML, etc.

The statistics server 710 collects information about status, performance, and resource consumption from all of the other server components. The statistics server 710 can be accessed from the studio 704 to obtain the status of various alert monitors.

The preprocessor server 712 is used for analyzing text data and extracting the information on which the text search capabilities are based.

The name server 714 holds information about the database topology. This is used in a distributed system with instances of the database on different hosts. The name server 714 knows where the components are running and which data is located on which server. In an example embodiment, a separate enqueue server may operate in the manner described above with respect to enqueue servers, specifically with regard to creating and managing light-weight enqueue sessions.

Figure 8:
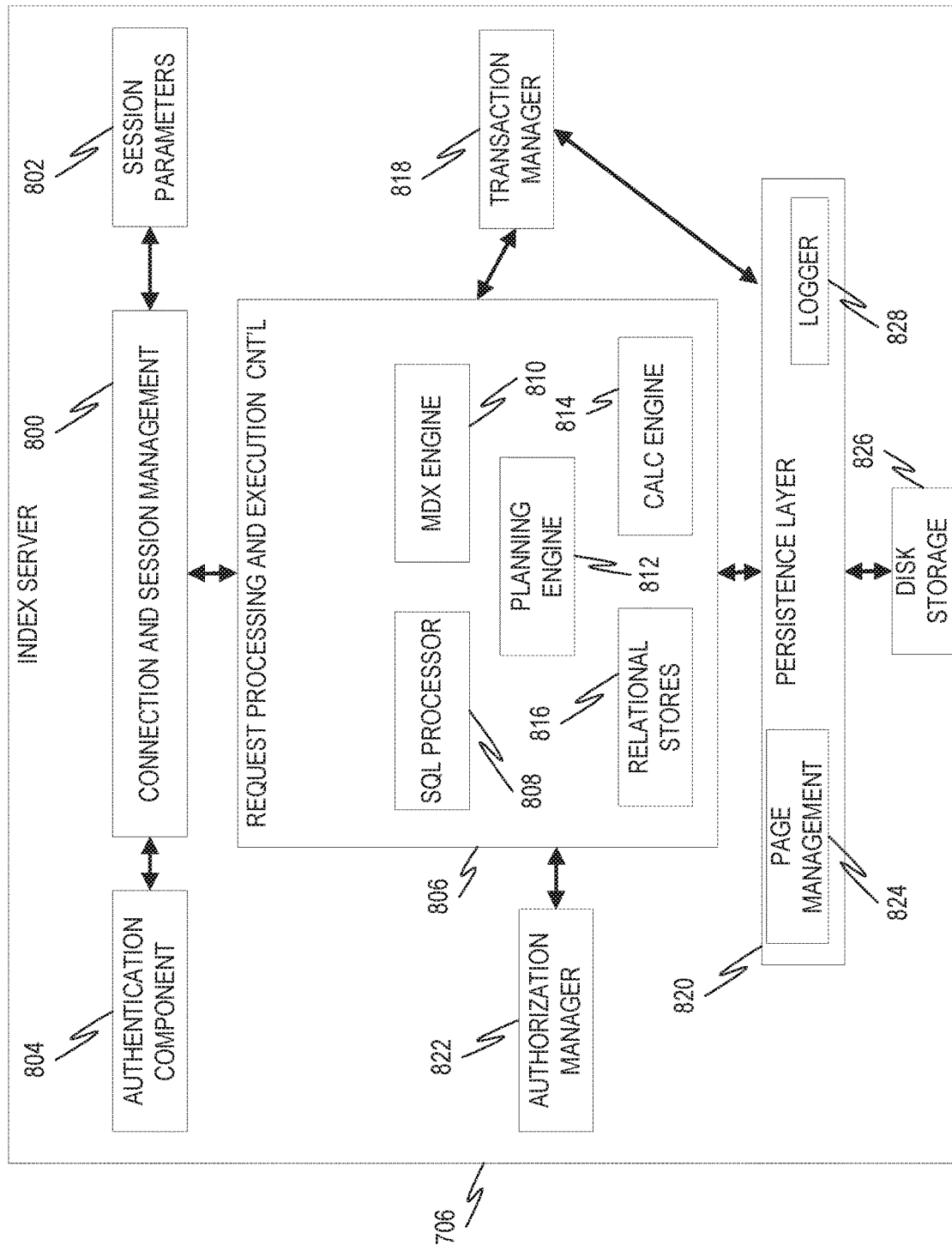
FIG. 8 is a diagram illustrating an example of the index server of FIG. 7.

FIG. 8 is a diagram illustrating an example of the index server 706. Specifically, the index server 706 of FIG. 7 is depicted in more detail. The index server 706 includes a connection and session management component 800, which is responsible for creating and managing sessions and connections for the database clients (e.g., client applications 702A, 702B). Once a session is established, clients can communicate with the database management system 700 using SQL statements. For each session, a set of session parameters 802 may be maintained, such as auto-commit, current transaction isolation level, etc. Users (e.g., system administrators, developers) may be authenticated by the database management system 700 itself (e.g., by logging in with log-in information such as a user name and password, using an authentication component 804), or authentication can be delegated to an external authentication provider such as a Lightweight Directory Access Protocol (LDAP) directory.

Client queries can be analyzed and executed by a set of components summarized as request processing and execution control 806. An SQL processor 808 checks the syntax and semantics of the client SQL statements and generates a logical execution plan. MDX is a language for querying and manipulating multidimensional data stored in online analytical processing(OLAP) cubes. As such, an MDX engine 810 may be provided to allow for the parsing and executing of MDX commands. A planning engine 812 allows applications to execute basic planning operations in the database layer. One such operation is to create a new version of a dataset as a copy of an existing dataset, while applying filters and transformations.

A calculation engine 814 implements the various SQL script and planning operations. The calculation engine 814 creates a logical execution plan for calculation models derived from SQL script, MDX, planning, and domain-specific models. This logical execution plan may include, for example, breaking up a model into operations that can be processed in parallel. The data is stored in relational stores 816, which implement a relational database in main memory. Each SQL statement may be processed in the context of a transaction. New sessions are implicitly assigned to a new transaction. A transaction manager 818 coordinates database transactions, controls transactional isolation, and keeps track of running and closed transactions. When a transaction is committed or rolled back, the transaction manager 818 informs the involved engines about this event so they can execute needed actions. The transaction manager 818 also cooperates with a persistence layer 820 to achieve atomic and durable transactions.

An authorization manager 822 is invoked by other database system components to check whether the user has the specified privileges to execute the requested operations. The database management system 700 allows for the granting of privileges to users or roles. A privilege grants the right to perform a specified operation on a specified object.

The persistence layer 820 ensures that the database is restored to the most recent committed state after a restart and that transactions are either completely executed or completely undone. To achieve this goal in an efficient way, the persistence layer 820 uses a combination of write-ahead logs, shadow paging, and save points. The persistence layer 820 also offers a page management interface 824 for writing and reading data to a separate disk storage 826, and also contains a logger 828 that manages the transaction log. Log entries can be written implicitly by the persistence layer 820 when data is written via the persistence interface or explicitly by using a log interface.

Figure 9:
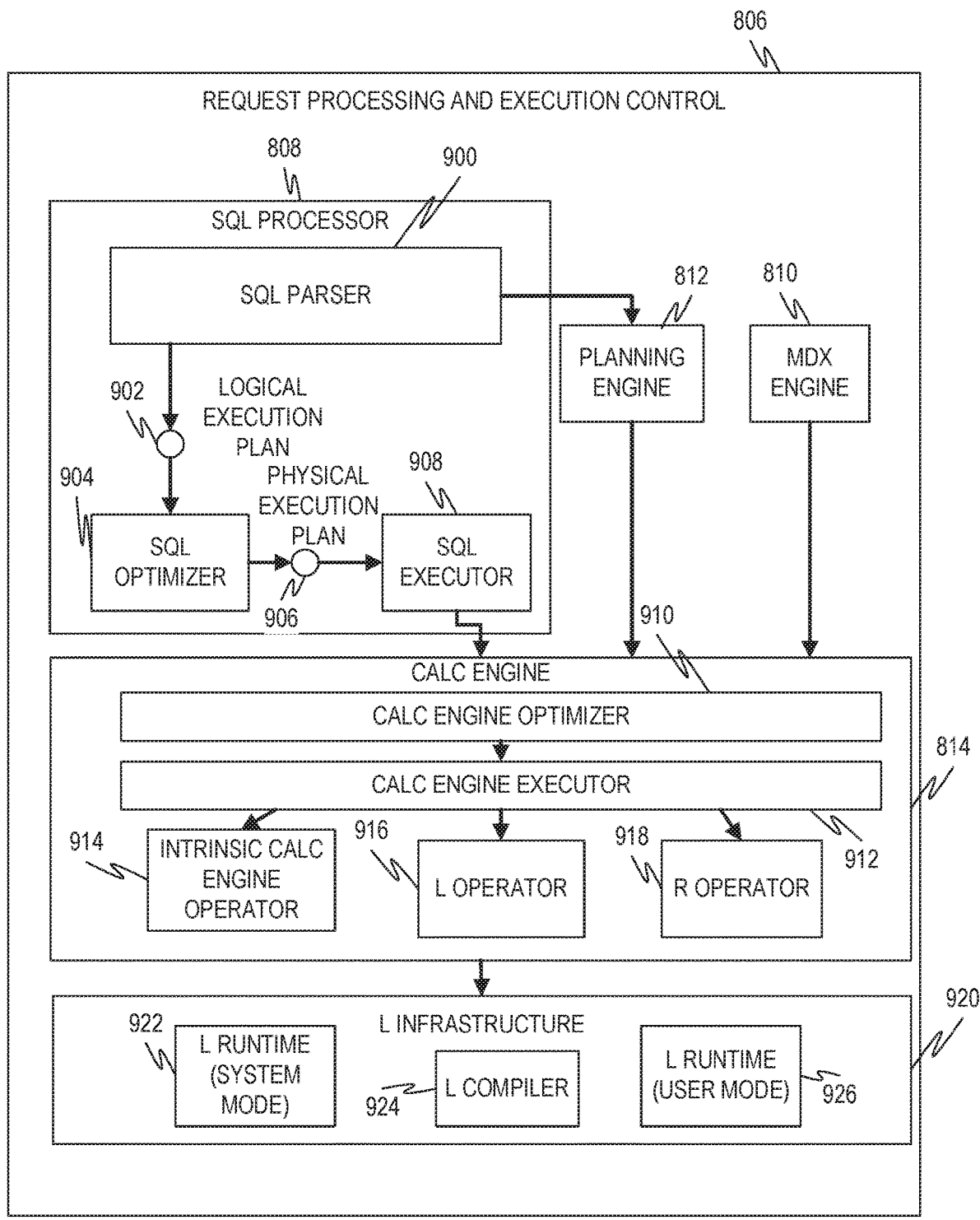
FIG. 9 is a diagram illustrating one example of the request processing and execution control of FIG. 8.

FIG. 9 is a diagram illustrating one example of the request processing and execution control 806. This diagram depicts the request processing and execution control 806 of FIG. 8 in more detail. The SQL processor 808 contains an SQL parser 900, which parses the SQL statement and generates a logical execution plan 902, which it passes to an SQL optimizer 904. The SQL optimizer 904 optimizes the logical execution plan 902 and converts it to a physical execution plan 906, which it then passes to a SQL executer 908. The calculation engine 814 implements the various SQL script and planning operations, and includes a calc engine optimizer 910, which optimizes the operations, and a calc engine executor 912, which executes the operations, as well as an intrinsic calc engine operator 914, an L operator 916, and an R operator 918. For example, the calc engine optimizer 910 may be configured, as described herein, to optimize queries by considering null information to skip one or more expressions when another expression returns null.

An L infrastructure 920 includes a number of components to aid in the running of L procedures, including an L-runtime (system mode) 922, an L compiler 924, and an L-runtime (user mode) 926.

EXAMPLES

Example 1 is a system for optimizing database queries, the system comprising at least one processor and a machine-readable medium in communication with the at least one processor, wherein the at least one processor is programmed to perform operations comprising: receiving a first query comprising a plurality of query expressions; determining that a first expression of the first query is nullable; determining that the first expression is null preserving; generating optimized query code for the first query, the optimized query code comprising: a first code segment that, when executed by a processor, causes the processor to perform operations comprising determining a value of the first expression; and a conditional jump instruction; and wherein the conditional jump instruction, when executed by the processor, causes the processor to perform operations comprising: skipping execution of at least a portion of the first code segment; and returning null for the first expression.

In Example 2, the subject matter of Example 1 optionally includes wherein the first code segment comprises: a first instruction that, when executed by the processor causes the processor to perform operations comprising setting a value of a first expression variable to null; and a second instruction that, when executed by the processor, causes the processor to perform operations comprising setting the value of the first expression variable to the value of the first expression, wherein the at least a portion of the first code segment skipped by the conditional jump instruction comprises the second instruction.

In Example 3, the subject matter of any one or more of Examples 1-2 optionally includes wherein the at least one processor is further programmed to perform operations comprising, before generating the first code segment, determining that a first child expression of the first expression is permitted to return a null value.

In Example 4, the subject matter of any one or more of Examples 1-3 optionally includes wherein the at least one processor is further programmed to perform operations comprising determining that a second expression of the first query is not nullable, wherein the optimized query code further comprises: a third code segment that, when executed by the processor, causes the processor to perform operations comprising determining a value of a first child expression of the second expression; and a fourth code segment that, when executed by the processor causes the processor to perform operations comprising determining a value of the second expression.

In Example 5, the subject matter of any one or more of Examples 1-4 optionally includes wherein the at least one processor is further programmed to perform operations comprising: determining that a first child expression of the first expression is nullable; determining that the first child expression is null preserving, wherein the optimized query code further comprises: a third code segment that, when executed by the processor, causes the processor to perform operations comprising determining a value of the first child expression; and a fourth code segment that, when executed by the processor, causes the processor to perform operations comprising determining a value of a first sub-child expression of the first child expression.

In Example 6, the subject matter of Example 5 optionally includes wherein the at least one processor is further programmed to perform operations comprising determining that the first child expression does not preserve not null, wherein the fourth code segment comprises a second conditional jump instruction; and wherein the second conditional jump instruction, when executed by the processor, causes the processor to perform operations comprising: skipping execution of at least a portion of the third code segment; and returning null for the first expression.

In Example 7, the subject matter of any one or more of Examples 1-6 optionally includes wherein the at least one processor is further programmed to perform operations comprising: determining that a second expression of the first query is nullable; determining that the second expression is null preserving; and determining that no child expression of the second expression is nullable, wherein the optimized query code comprises: a third code segment that, when executed by the processor, causes the processor to perform operations comprising determining a value of a first child expression of the second expression; and a fourth code segment that, when executed by the processor, causes the processor to perform operations comprising determining a value of the second expression.

Example 8 is a method for optimizing database queries, the method comprising: receiving, by a computing device comprising at least one processor, a first query comprising a plurality of query expressions; determining, by the computing device, that a first expression of the first query is nullable; determining, by the computing device, that the first expression is null preserving; generating, by the computing device, optimized query code for the first query, the optimized query code comprising: a first code segment that, when executed by a processor, causes the processor to perform operations comprising determining a value of the first expression; and a conditional jump instruction; and wherein the conditional jump instruction, when executed by the processor, causes the processor to perform operations comprising: skipping execution of at least a portion of the first code segment; and returning null for the first expression.

In Example 9, the subject matter of Example 8 optionally includes wherein the first code segment comprises: a first instruction that, when executed by the processor causes the processor to perform operations comprising setting a value of a first expression variable to null; and a second instruction that, when executed by the processor causes the processor to perform operations comprising setting the value of the first expression variable to the value of the first expression, wherein the at least a portion of the first code segment skipped by the conditional jump instruction comprises the second instruction.

In Example 10, the subject matter of any one or more of Examples 8-9 optionally includes before generating the first code segment, determining that a first child expression of the first expression is permitted to return a null value.

In Example 11, the subject matter of any one or more of Examples 8-10 optionally includes determining that a second expression of the first query is not nullable, wherein the optimized query code further comprises: a third code segment that, when executed by the processor, causes the processor to perform operations comprising determining a value of a first child expression of the second expression; and a fourth code segment that, when executed by the processor causes the processor to perform operations comprising determining a value of the second expression.

In Example 12, the subject matter of any one or more of Examples 8-11 optionally includes determining that a first child expression of the first expression is nullable; determining that the first child expression is null preserving, wherein the optimized query code further comprises: a third code segment that, when executed by the processor, causes the processor to perform operations comprising determining a value of the first child expression; and a fourth code segment that, when executed by the processor, causes the processor to perform operations comprising determining a value of a first sub-child expression of the first child expression.

In Example 13, the subject matter of Example 12 optionally includes determining that the first child expression does not preserve not null, wherein the fourth code segment comprises a second conditional jump instruction; and wherein the second conditional jump instruction, when executed by the processor, causes the processor to perform operations comprising: skipping execution of at least a portion of the third code segment; and returning null for the first expression.

In Example 14, the subject matter of any one or more of Examples 8-13 optionally includes determining that a second expression of the first query is nullable; determining that the second expression is null preserving; and determining that no child expression of the second expression is nullable, wherein the optimized query code comprises: a third code segment that, when executed by the processor, causes the processor to perform operations comprising determining a value of a first child expression of the second expression; and a fourth code segment that, when executed by the processor, causes the processor to perform operations comprising determining a value of the second expression.

Example 15 is a machine-readable medium comprising instructions thereon that, when executed by at least one processor, cause the processor to perform operations comprising: receiving a first query comprising a plurality of query expressions; determining that a first expression of the first query is nullable; determining that the first expression is null preserving; generating optimized query code for the first query, the optimized query code comprising: a first code segment that, when executed by a processor, causes the processor to perform operations comprising determining a value of the first expression; and a conditional jump instruction; and wherein the conditional jump instruction, when executed by the processor, causes the processor to perform operations comprising: skipping execution of at least a portion of the first code segment; and returning null for the first expression.

In Example 16, the subject matter of Example 15 optionally includes wherein the first code segment comprises: a first instruction that, when executed by the processor causes the processor to perform operations comprising setting a value of a first expression variable to null; and a second instruction that, when executed by the processor causes the processor to perform operations comprising setting the value of the first expression variable to the value of the first expression, wherein the at least a portion of the first code segment skipped by the conditional jump instruction comprises the second instruction.

In Example 17, the subject matter of any one or more of Examples 15-16 optionally includes wherein the at least one processor is further programmed to perform operations comprising, before generating the first code segment, determining that a first child expression of the first expression is permitted to return a null value.

In Example 18, the subject matter of any one or more of Examples 15-17 optionally includes wherein the at least one processor is further programmed to perform operations comprising determining that a second expression of the first query is not nullable, wherein the optimized query code further comprises: a third code segment that, when executed by the processor, causes the processor to perform operations comprising determining a value of a first child expression of the second expression; and a fourth code segment that, when executed by the processor causes the processor to perform operations comprising determining a value of the second expression.

In Example 19, the subject matter of any one or more of Examples 15-18 optionally includes wherein the at least one processor is further programmed to perform operations comprising: determining that a first child expression of the first expression is nullable; determining that the first child expression is null preserving, wherein the optimized query code further comprises: a third code segment that, when executed by the processor, causes the processor to perform operations comprising determining a value of the first child expression; and a fourth code segment that, when executed by the processor, causes the processor to perform operations comprising determining a value of a first sub-child expression of the first child expression.

In Example 20, the subject matter of Example 19 optionally includes wherein the at least one processor is further programmed to perform operations comprising determining that the first child expression does not preserve not null, wherein the fourth code segment comprises a second conditional jump instruction, and wherein the second conditional jump instruction, when executed by the processor, causes the processor to perform operations comprising: skipping execution of at least a portion of the third code segment; and returning null for the first expression.

Figure 10:
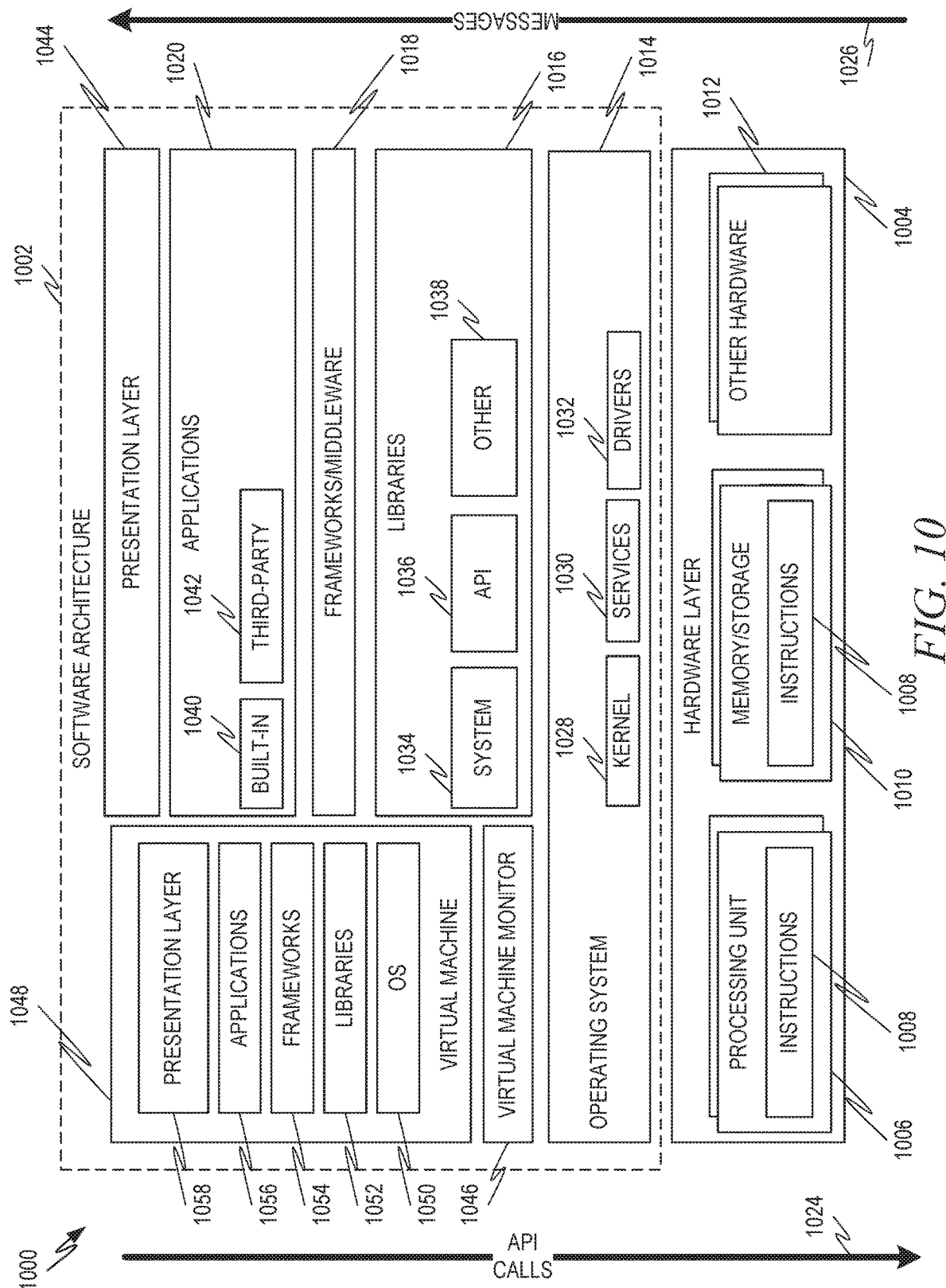
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system 1100 of FIG. 11.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012, which represents any other hardware of the hardware layer 1004, such as the other hardware illustrated as part of computer system 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke API calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers). Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 10D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules. In some examples, libraries 1016 may provide one or more APIs serviced by a message oriented middleware.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030 and/or drivers 1032), libraries (e.g., system 1034, APIs 1036, and other libraries 1038), frameworks/middleware 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine 1048 is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g. programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
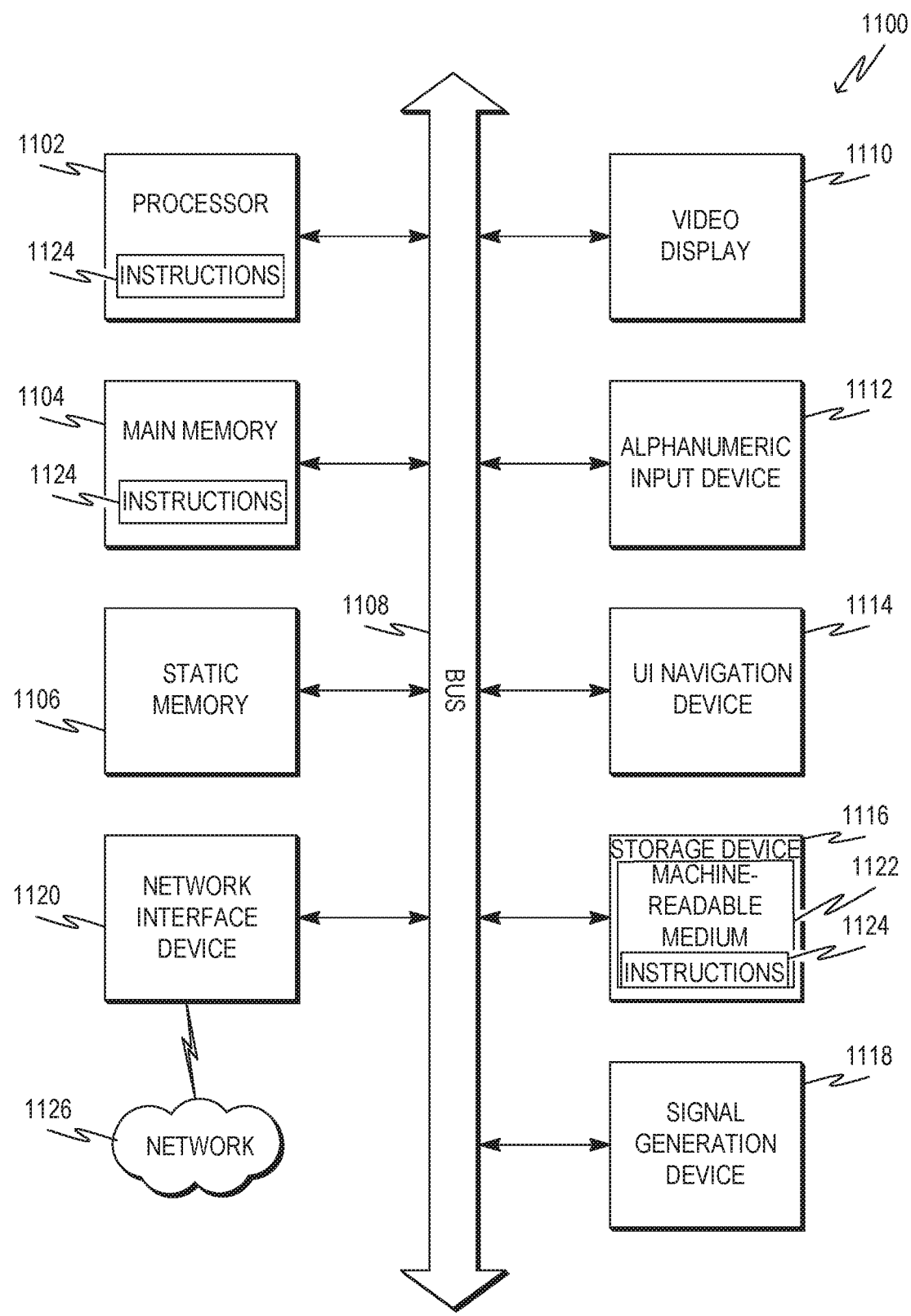
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a UI navigation (or cursor control) device 1114 (e.g., a mouse), a disk drive or storage device 1116, a signal generation device 1118 (e.g., a speaker), and a network interface device 1120.

Machine-Readable Medium

The disk drive device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for optimizing database queries, the system comprising at least one processor and a machine-readable medium in communication with the at least one processor, wherein the at least one processor is programmed to perform operations comprising:
   receiving a first query comprising a plurality of query expressions;
   determining that a first expression of the first query is permitted to return null;
   determining that the first expression returns null if any argument of the first expression is null;
   determining that the first expression is permitted to return null if no arguments of the first expression are null;
   determining that a first child expression of the first expression is permitted to return null;
   responsive to determining that the first expression is permitted to return null, that the first expression returns null if any argument of the first expression is null, that the first expression is permitted to return null if no arguments of the first expression are null, and that the first child expression is permitted to return null, generating optimized query code for the first query, the optimized query code comprising:
     a first code segment that, when executed by a processor, causes the processor to perform operations comprising determining a value of the first expression; and
     a conditional jump instruction that, when executed by the at least one processor, causes the at least one processor to perform operations comprising:
       determining that the first child expression of the first expression returns null;

after determining that the first child expression returns null, skipping execution of at least a portion of the first code segment corresponding to at least a second child expression of the first expression; and returning null for the first expression; and executing the optimized query code at a database management system.

2. The system of claim 1, wherein the first code segment comprises:
a first instruction that, when executed by the processor causes the processor to perform operations comprising setting a value of a first expression variable to null; and
a second instruction that, when executed by the processor, causes the processor to perform operations comprising setting the value of the first expression variable to the value of the first expression, wherein the at least a portion of the first code segment skipped by the conditional jump instruction comprises the second instruction.

3. The system of claim 1, wherein the at least one processor is further programmed to perform operations comprising, before generating the first code segment, determining that a first child expression of the first expression is permitted to return a null value.

4. The system of claim 1, wherein the at least one processor is further programmed to perform operations comprising determining that a second expression of the first query is not permitted to return null, wherein the optimized query code further comprises:
a third code segment that, when executed by the processor, causes the processor to perform operations comprising determining a value of a first child expression of the second expression; and
a fourth code segment that, when executed by the processor causes the processor to perform operations comprising determining a value of the second expression.

5. The system of claim 1, wherein the at least one processor is further programmed to perform operations comprising:
determining that a first child expression of the first expression is permitted to return null;
determining that the first child expression is returns null if any argument of the first expression is null, wherein the optimized query code further comprises:
a third code segment that, when executed by the processor, causes the processor to perform operations comprising determining a value of the first child expression; and
a fourth code segment that, when executed by the processor, causes the processor to perform operations comprising determining a value of a first sub-child expression of the first child expression.

6. The system of claim 5, wherein the at least one processor is further programmed to perform operations comprising determining that the first child expression does not preserve not null, wherein the fourth code segment comprises a second conditional jump instruction; and
wherein the second conditional jump instruction, when executed by the processor, causes the processor to perform operations comprising: skipping execution of at least a portion of the third code segment; and returning null for the first expression.

7. The system of claim 1, wherein the at least one processor is further programmed to perform operations comprising:

determining that a second expression of the first query is permitted to return null;
determining that the second expression is returns null if any argument of the second expression is null; and
determining that no child expression of the second expression is permitted to return null, wherein the optimized query code comprises:
a third code segment that, when executed by the processor, causes the processor to perform operations comprising determining a value of a first child expression of the second expression; and
a fourth code segment that, when executed by the processor, causes the processor to perform operations comprising determining a value of the second expression.

8. A method for optimizing database queries, the method comprising:
receiving, by a computing device comprising at least one processor, a first query comprising a plurality of query expressions;
determining, by the computing device, that a first expression of the first query is permitted to return null;
determining, by the computing device, that the first expression returns null if any argument of the first expression is null;
determining that the first expression is permitted to return null if no arguments of the first expression are null;
determining that a first child expression of the first expression is permitted to return null;
responsive to determining that the first expression is permitted to return null, that the first expression returns null if any argument of the first expression is null, that the first expression is permitted to return null if no arguments of the first expression are null, and that the first child expression is permitted to return null, generating, by the computing device, optimized query code for the first query, the optimized query code comprising:
a first code segment that, when executed by a processor, causes the processor to perform operations comprising determining a value of the first expression; and
a conditional jump instruction that, when executed by the at least one processor, causes the at least one processor to perform operations comprising:
determining that the first child expression of the first expression returns null;
after determining that the first child expression of the first expression returns null, skipping execution of at least a portion of the first code segment corresponding to at least a second child expression of the first expression; and
returning null for the first expression; and
executing the optimized query code at a database management system.

9. The method of claim 8, wherein the first code segment comprises:
a first instruction that, when executed by the processor causes the processor to perform operations comprising setting a value of a first expression variable to null; and
a second instruction that, when executed by the processor causes the processor to perform operations comprising setting the value of the first expression variable to the value of the first expression, wherein the at least a portion of the first code segment skipped by the conditional jump instruction comprises the second instruction.

10. The method of claim 8, further comprising, before generating the first code segment, determining that a first child expression of the first expression is permitted to return a null value.

11. The method of claim 8, further comprising determining that a second expression of the first query is not permitted to return null, wherein the optimized query code further comprises:
- a third code segment that, when executed by the processor, causes the processor to perform operations comprising determining a value of a first child expression of the second expression; and
- a fourth code segment that, when executed by the processor causes the processor to perform operations comprising determining a value of the second expression.

12. The method of claim 8, further comprising:
- determining that a first child expression of the first expression is permitted to return null;
- determining that the first child expression is returns null if any argument of the first expression is null, wherein the optimized query code further comprises:
- a third code segment that, when executed by the processor, causes the processor to perform operations comprising determining a value of the first child expression; and
- a fourth code segment that, when executed by the processor, causes the processor to perform operations comprising determining a value of a first sub-child expression of the first child expression.

13. The method of claim 12, further comprising determining that the first child expression does not preserve not null, wherein the fourth code segment comprises a second conditional jump instruction; and
- wherein the second conditional jump instruction, when executed by the processor, causes the processor to perform operations comprising:
- skipping execution of at least a portion of the third code segment; and
- returning null for the first expression.

14. The method of claim 8, further comprising:
- determining that a second expression of the first query is permitted to return null;
- determining that the second expression is returns null if any argument of the second expression is null; and
- determining that no child expression of the second expression is permitted to return null, wherein the optimized query code comprises:
- a third code segment that, when executed by the processor, causes the processor to perform operations comprising determining a value of a first child expression of the second expression; and
- a fourth code segment that, when executed by the processor, causes the processor to perform operations comprising determining a value of the second expression.

15. A machine-readable medium comprising instructions thereon that, when executed by at least one processor, cause the at least one processor to perform operations comprising:
- receiving a first query comprising a plurality of query expressions;
- determining that a first expression of the first query is permitted to return null;
- determining that the first expression is returns null if any argument of the first expression is null;
- determining that the first expression is permitted to return null if no arguments of the first expression are null;
- determining that a first child expression of the first expression is permitted to return null; and
- responsive to determining that the first expression is permitted to return null, that the first expression returns null if any argument of the first expression is null, that the first expression is permitted to return null if no arguments of the first expression are null, and that the first child expression is permitted to return null, generating optimized query code for the first query the optimized query code comprising:
- a first code segment that, when executed by a processor, causes the processor to perform operations comprising determining a value of the first expression; and
- a conditional jump instruction that when executed by the processor, causes the processor to perform operations comprising:
- determining that the first child expression of the first expression returns null;
- after determining that the first child expression of the first expression returns null, skipping execution of at least a portion of the first code segment corresponding to at least a second child expression of the first expression; and
- returning null for the first expression; and
- executing the optimized query code at a database management system.

16. The machine-readable medium of claim 15, wherein the first code segment comprises:
- a first instruction that, when executed by the processor causes the processor to perform operations comprising setting a value of a first expression variable to null; and
- a second instruction that, when executed by the processor causes the processor to perform operations comprising setting the value of the first expression variable to the value of the first expression, wherein the at least a portion of the first code segment skipped by the conditional jump instruction comprises the second instruction.

17. The machine-readable medium of claim 15, wherein the at least one processor is further programmed to perform operations comprising, before generating the first code segment, determining that a first child expression of the first expression is permitted to return a null value.

18. The machine-readable medium of claim 15, wherein the at least one processor is further programmed to perform operations comprising determining that a second expression of the first query is not permitted to return null, wherein the optimized query code further comprises:
- a third code segment that, when executed by the processor, causes the processor to perform operations comprising determining a value of a first child expression of the second expression; and
- a fourth code segment that, when executed by the processor causes the processor to perform operations comprising determining a value of the second expression.

19. The machine-readable medium of claim 15, wherein the at least one processor is further programmed to perform operations comprising:
- determining that a first child expression of the first expression is permitted to return null;
- determining that the first child expression is returns null if any argument of the first expression is null, wherein the optimized query code further comprises:
- a third code segment that, when executed by the processor, causes the processor to perform operations comprising determining a value of the first child expression; and a fourth code segment that, when executed by the processor, causes the processor to perform operations comprising determining a value of a first sub-child expression of the first child expression.

20. The machine-readable medium of claim 19, wherein the at least one processor is further programmed to perform operations comprising determining that the first child expression does not preserve not null, wherein the fourth code segment comprises a second conditional jump instruction, and wherein the second conditional jump instruction, when executed by the processor, causes the processor to perform operations comprising: skipping execution of at least a portion of the third code segment; and returning null for the first expression.

* * * * *